US012189025B2

(12) United States Patent
Rosu et al.

(10) Patent No.: US 12,189,025 B2
(45) Date of Patent: Jan. 7, 2025

(54) CFAR PHASED ARRAY PRE-PROCESSING USING NONCOHERENT AND COHERENT INTEGRATION IN AUTOMOTIVE RADAR SYSTEMS

(71) Applicant: NXP USA, Inc., Austin, TX (US)

(72) Inventors: Filip Alexandru Rosu, Bucharest (RO); Daniel Silion, Bucharest (RO)

(73) Assignee: NXP USA, Inc., Austin, TX (US)

( * ) Notice: Subject to any disclaimer, the term of this patent is extended or adjusted under 35 U.S.C. 154(b) by 334 days.

(21) Appl. No.: 17/807,279

(22) Filed: Jun. 16, 2022

(65) Prior Publication Data

US 2023/0168367 A1    Jun. 1, 2023

(30) Foreign Application Priority Data

Nov. 26, 2021    (RO) .............................. a 2021 00722

(51) Int. Cl.
*G01S 13/931* (2020.01)
*H04B 7/0413* (2017.01)

(52) U.S. Cl.
CPC .......... *G01S 13/931* (2013.01); *H04B 7/0413* (2013.01)

(58) Field of Classification Search
None
See application file for complete search history.

(56) References Cited

U.S. PATENT DOCUMENTS 4,104,633 A * 8/1978 Donahue ............... G01S 7/2922
342/93

5,499,030 A * 3/1996 Wicks ..................... G01S 7/292
342/159
2006/0232464 A1* 10/2006 Onorato ................ G01S 7/2921
342/197

FOREIGN PATENT DOCUMENTS

CN           104502899 A  *  4/2015  ............. G01S 7/292

OTHER PUBLICATIONS

Katzlberger, Christina; "Object Detection with Automotive Radar Sensors Using CFAR-Algorithms"; Bachelor Thesis—Johannes Kepler University Linz; 26 pages Sep. 2018.
ODonnell; Introduction to Radar Systems, Detection of Targets in Noise and Pulse Compression Techniques; MIT Lincoln Laboratory, Radar Course; retrieved from the Internet https://www.ll.mit.edu/sites/default/files/outreach/doc/2018-07/lecture%205.pdf; 43 pages; Jun. 18, 2002.

(Continued)

*Primary Examiner* — Bernarr E Gregory

(57) ABSTRACT

A vehicle radar system, apparatus and method use a radar control processing unit generate compressed radar data signals, to apply the compressed radar data signals in parallel as a three-dimensional matrix to a coherent integrator (which generates a two-dimensional matrix of coherently integrated image data) and a non-coherent integrator (which generates a two-dimensional matrix of non-coherently integrated image data), and to generate a constant false alarm rate (CFAR) threshold from the two-dimensional matrix of non-coherently integrated image data for application to the two-dimensional matrix of coherently integrated image data to detect one or more targets in the MIMO radar signal returns from sample values from the two-dimensional matrix of coherently integrated image data that exceed the CFAR threshold.

20 Claims, 12 Drawing Sheets

(56) References Cited

OTHER PUBLICATIONS

Skolnik, Merrill I, Editor in Chief; "Radar Handbook—Second Edition, Chapter 8 Automatic Detection, Tracking, and Sensor Integration"; G. V. Trunk Naval Research Laboratory; 59 pages (1990).

Lin Yu-Chien et al., "Low-Complexity High-Resolution Parameter Estimation for Automotive MIMO Radars", IEEE, USA vol. 8, pp. 16127-16138, (Jul. 1, 2019).

* cited by examiner

CFAR PHASED ARRAY PRE-PROCESSING USING NONCOHERENT AND COHERENT INTEGRATION IN AUTOMOTIVE RADAR SYSTEMS

CROSS-REFERENCE TO RELATED APPLICATIONS

This application claims the priority under 35 U.S.C. § 119 of Romania patent application no. A202100722, filed Nov. 26, 2021 the contents of which are incorporated by reference herein.

BACKGROUND OF THE INVENTION

Field of the Invention

The present invention is directed in general to radar systems and associated methods of operation. In one aspect, the present invention relates to an automotive radar system which uses a constant false alarm rate receiver and associated methods of operation.

Description of the Related Art

To improve the safety of vehicle and passengers, Advanced Driver Assistance Systems (ADAS) systems use radar-based detection to provide reliable and accurate details of a vehicle's surroundings and to assist drivers to sense the on-road potential hazards in case of blocked vision or poor visibility conditions. In recent years, ADAS radars have seen an exponential growth in angular resolution requirements, but the requirement of obtaining high resolution Direction of Arrival (DoA) estimations can be computationally exhaustive, and even limit real-time capabilities of the system. In addition, the cost and space constraints of implementing radar systems on a vehicle, such as limits on the number of channels and antennas that may be used, can further constrain the detection processing capabilities.

As a result of these processing constraints, the computationally exhaustive super-resolution radar detection algorithms (such as MUSIC or ESPRIT) can rarely be applied on the entire raw data cube. It is thus preferred to apply DoA estimation on detections, rather than process the entire raw data, such as by using Constant False Alarm Rate (CFAR) detection algorithms to detect target returns against a background of noise, clutter and interference. Arguably representing the most important radar processing step, CFAR algorithms are used to differentiate between targets and noise, and are characterized by a constant false alarm rate measure of how often noise is classified as a target. Various CFAR algorithms were designed to maximize the probability of detecting a target, given an imposed probability of false alarm. For example, the cell-averaging CFAR (CA-CFAR) algorithm family is the least complex CFAR algorithm that is suitable for use with systems having low to average computational power, and requires that the input data is a measure of power. However, CFAR algorithms, especially CA-CFAR algorithms, are not well suited to detect multiple high SNR targets that are closely spaced together. And while CFAR offers better results when targets have low SNR values, target(s) with a high SNR value will increase the value of the threshold, causing other adjacent targets to be masked by the CFAR threshold.

As seen from the foregoing, the existing CFAR receiver processing solutions are extremely difficult at a practical level by virtue of the balancing performance, complexity, and computational requirements when quickly, accurately, and efficiently identifying one or more radar targets with radar system applications.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
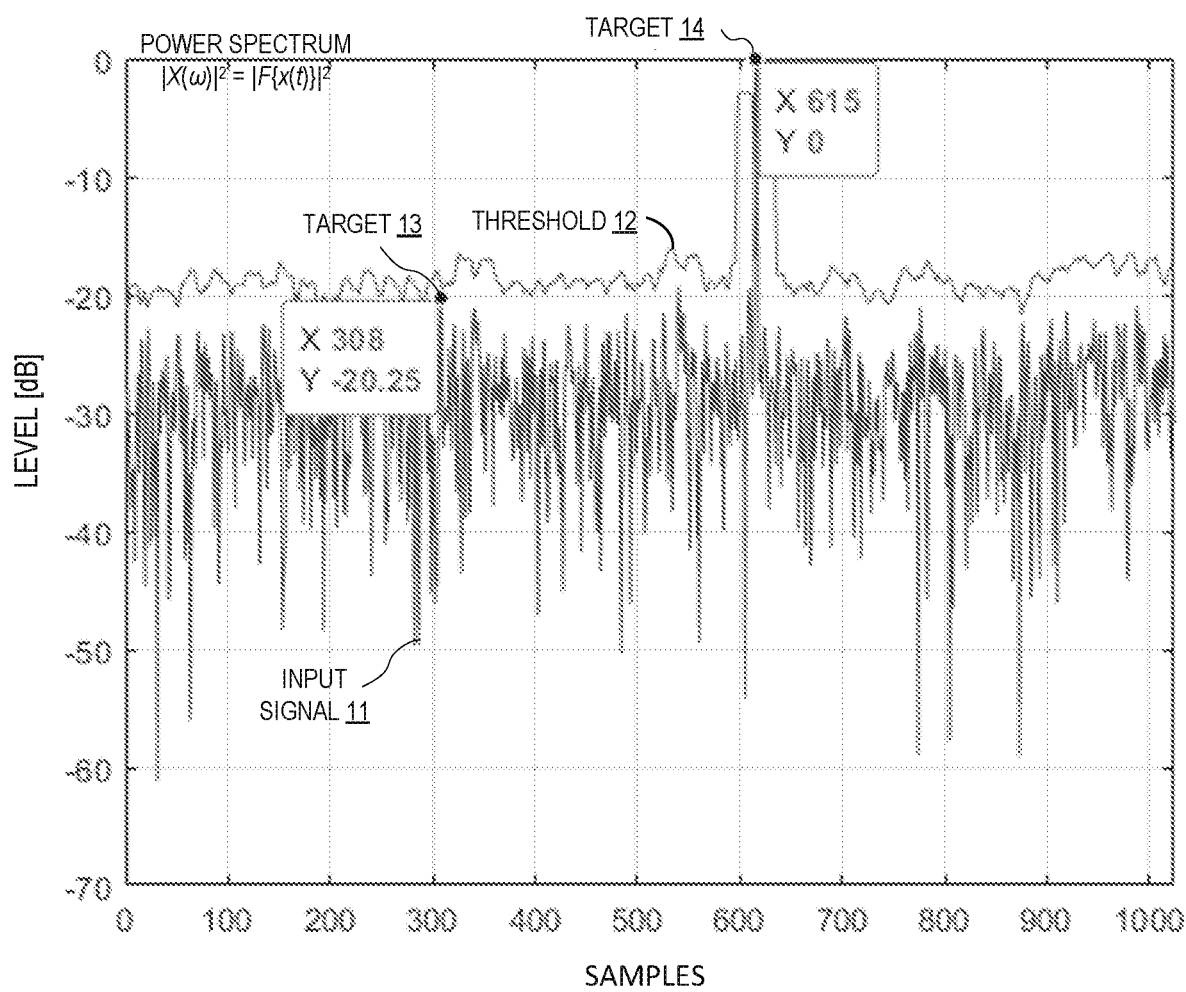
FIG. 1 depicts an example range profile for a CA-CFAR threshold that is applied to a range-compressed input signal for detecting two targets.

A radar system, apparatus, and methodology are described for detecting one or more targets with a constant false alarm rate detector by estimating an extremely precise CFAR threshold based on a low SNR data set that is generated from non-coherently integrated data, and then applying the estimated CFAR threshold to high SNR data that is generated from coherently integrated data, thereby maximizing the probability of detection without degrading the probability of false alarm. To this end, the target detecting radar system, apparatus, and method may include a CFAR detector which processes a Range-Doppler-compressed input data stream with a processor core by performing non-coherent integration of samples from the input data stream for storage in a first two-dimensional matrix. In selected embodiments, the Range-Doppler-compressed input data stream is generated by performing an initial image compression step, such as Range-Doppler (or Range-Azimuth compression for synthetic aperture radar applications), to generate a three-dimensional image matrix (e.g., Range-Doppler Matrix) from the receiver channels. Next, the image matrix is non-coherently integrated or combined among all channels (e.g., averaged) to produce a two-dimensional image matrix of non-coherent integration data. In addition, the CFAR detector includes a CFAR threshold calculating unit that computes a scaled CFAR threshold by using a predetermined scaling or mapping factor R having a closed form solution. In selected embodiments, the CFAR threshold calculating unit calculates a CFAR threshold $T_{CFAR}$ from the non-coherent integration data, where $T_{CFAR}$ can be a cell-average CFAR threshold $T_{CA\text{-}CFAR}$ or an ordered statistics CFAR threshold $T_{OS\text{-}CFAR}$ obtained from the non-coherent integrated data. In addition, the CFAR threshold calculating unit computes a scaling factor $$\beta = -\frac{\ln\left(1 - \sqrt[N_c]{1 - P_{FA}}\right)}{NN_c\left(P_{FA}^{-\frac{1}{N}} - 1\right)},$$

where ln represents the natural logarithm function, where Nc is the number of physical receiver channels (or virtual channels if MIMO is used), where $P_{FA}$ is the desired probability of false alarm, and where N is the number of data samples used to construct the threshold (e.g., the window size). Finally, the CFAR threshold calculating unit calculates computes a scaled CFAR threshold $T_{CFAR}'=\beta T_{CFAR}$. In parallel with processing of the non-coherent integration, the CFAR detector also processes the Range-Doppler-compressed input data stream with an FFT accelerator hardware by performing coherent integration of samples from the input data stream for storage in a second two-dimensional matrix. In selected embodiments, the image matrix is coherently combined among all receive channels in the spatial dimension (e.g., choosing a maximum value) to produce a two-dimensional image matrix of coherent integration data having improve SNR signal characteristics. Finally, the CFAR detector may include a detector unit that applies the scaled CFAR threshold to the coherently integrated data to detect targets from any input data that exceeds the scaled CFAR threshold, thereby greatly reducing the chance of low SNR targets being masked by the noise floor (as can occur with performing CFAR detection using only non-coherently integrated data) or by closely spaced high SNR targets (as can occur with performing CFAR detection using only coherently integrated data). In selected embodiments, a Fast Fourier Transform (FFT) accelerator may be used to quickly and efficiently perform coherent integration with reduced numerical complexity, and in parallel, a DSP or ARM processor core may be used to perform non-coherent integration.

In the context of the present disclosure, it will be appreciated that constant false alarm rate (CFAR) detection refers to an adaptive algorithm used in radar systems to detect target returns against a background of noise, clutter and interference. The role of the constant false alarm rate circuitry is to determine the power threshold above which any return can be considered to probably originate from a target. If this threshold is too low, then more targets will be detected at the expense of increased numbers of false alarms, resulting in a high false alarm rate. Conversely, if the threshold is too high, the false alarm rate will be low, but fewer targets will be detected. In most radar detectors, the threshold is set in order to achieve a required probability of false alarm (or equivalently, false alarm rate or time between false alarms). If the background against which targets are to be detected is constant with time and space, then a fixed threshold level can be chosen that provides a specified probability of false alarm. However, in most fielded systems, unwanted clutter and interference sources mean that the noise level changes both spatially and temporally. In such cases, a changing threshold can be used so that the threshold level is raised and lowered to maintain a constant probability of false alarm. This is known as constant false alarm rate (CFAR) detection. In most CFAR detection schemes, the threshold level is calculated by estimating the level of the noise floor around the cell under test (CUT). This can be found by taking a block of cells around the CUT and calculating the average power level, typically by ignoring the "guard cells" immediately adjacent to the CUT to avoid corrupting this estimate with power from the CUT itself. Once the threshold level is calculated as the local average power level, a target is detected at the CUT if it is both greater than all its adjacent cells and greater than the threshold level. This simple approach is called a cell-averaging CFAR (CA-CFAR). Other related approaches calculate separate averages for the cells to the left and right of the CUT, and then use the greatest-of or least-of these two power levels to define the local power level. These are referred to as greatest-of CFAR (GO-CFAR) and smallest-of CFAR (SO-CFAR) respectively, and can improve detection when immediately adjacent to areas of clutter.

To provide additional details for an improved contextual understanding of the present disclosure, reference is now made to FIG. 1 which depicts an example power spectrum range profile 10 for a single receiver channel where a computed CA-CFAR threshold 12 is applied having a specified probability of false alarm (e.g., $P_{FA}=10^{-4}$) to a range-compressed input signal 11 for detecting target peaks 13-14 for two targets located at distance samples 308 and 615. As will be appreciated, the CFAR algorithm used to compute the CA-CFAR threshold 12 is designed to find a threshold which will distinguish the peaks 13-14 generated by targets from the peaks generated by the input signal noise 11. Generally speaking, the threshold 12 is the product of (1) a pre-computed scaling factor that depends on the desired probability of false alarm $P_{FA}$ and the assumed noise distribution, and (2) a measured/estimated higher statistic of the signal, such as noise variance $\sigma^2$. To detect targets 13-14 from the input signal 11, the CFAR algorithm sequentially compares each sample, or cell under test (CUT), to the CA-CFAR threshold 12. If the amplitude of the CUT is larger than the CA-CFAR threshold 12, than it is classified as a detection. As depicted in the example power spectrum range profile 10, the range-compressed input signal 11 is generated as $|X(\omega)|^2=|F\{x(t)\}|^2$ to be the squared magnitude of the Fourier transform of the digital time domain signal (x(t)) that is output from the receiver channel. The CFAR algorithm generally assumes an exponential distribution of the range-compressed input signal 11, where the variance of the noise is proportional to the average value of the input signal 11. As a result of the range-compressed input signal 11 having a relatively large and "wiggly" variance that is proportional to the noise average, the computed CA-CFAR threshold 12 can detect certain high SNR target peaks (e.g., 14), but masks certain low SNR target peaks (e.g., 13).

Figure 2:
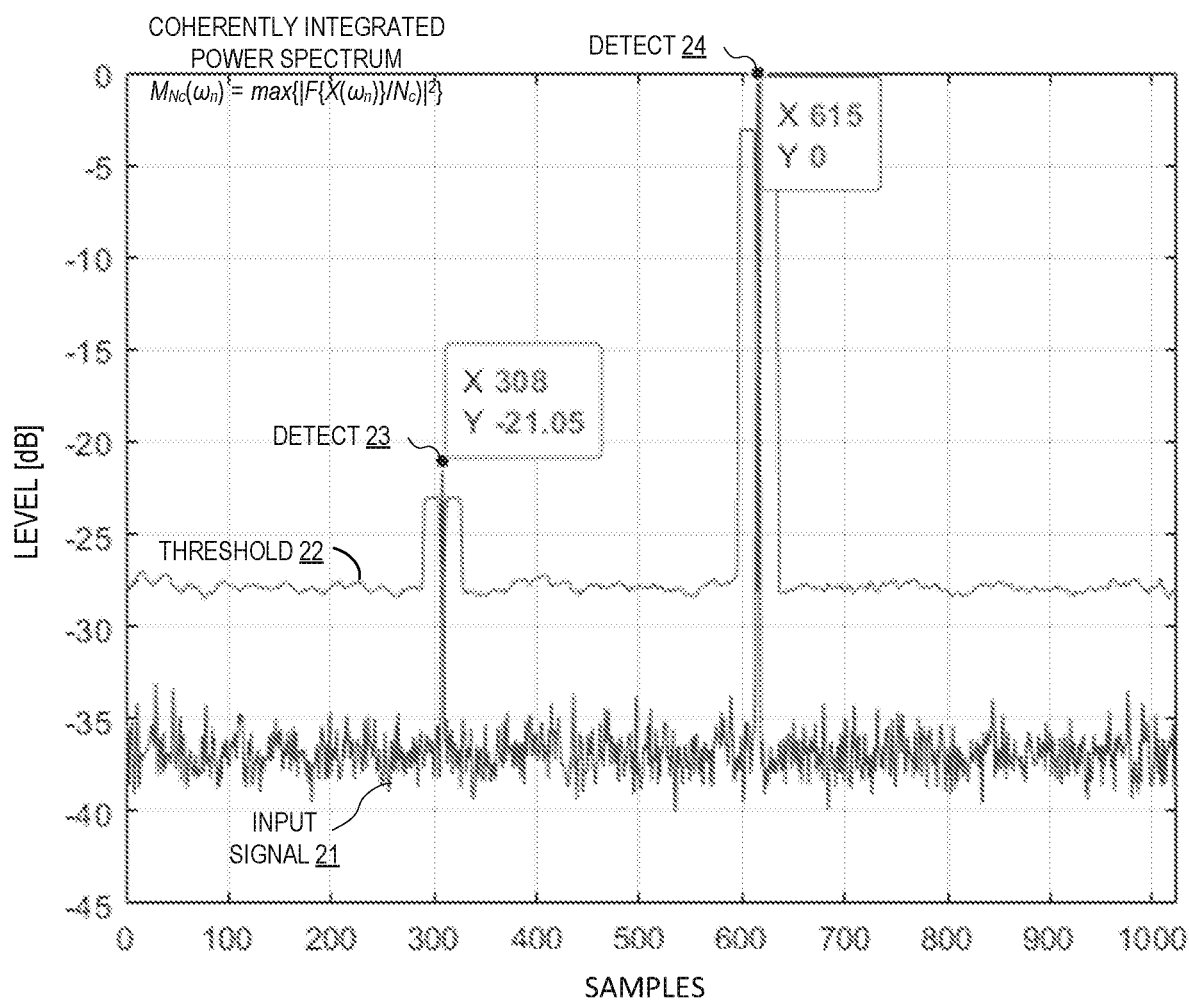
FIG. 2 depicts an example range profile for a CA-CFAR threshold that is applied to a coherently integrated range-compressed input signal for detecting two targets.

To provide additional details for an improved contextual understanding of the present disclosure, reference is now made to FIG. 2 which depicts an example range profile 20 where a computed CA-CFAR threshold 22 is applied to a coherently integrated range-compressed input signal 21 for detecting target peaks 23-24 for two targets located at distance samples 308 and 615. As will be understood by those skilled in the art, coherent integration (also referred to as coherent combining) is a compression technique which may be done via matched filtering for pulsed radars or fast Fourier transform (FFT) for frequency modulated continuous wave (FMCW) modulation radars. For example, the coherent integration procedure in the spatial domain (among receive channels) may use a Fourier transform, and apply global maximum on the absolute values of the output. This is done for each and every Range or Range-Doppler bin. Again, the CFAR algorithm computes and applies the CA-CFAR threshold 22 to find the threshold(s) which will distinguish the peaks 23-24 generated by targets from the peaks generated by the input signal noise 21. As depicted in the coherently integrated power spectrum range profile 20, the input signal 21 is generated as $M_{Nc}(\omega_n)=\max\{|F\{X(\omega_n)\}/N_c|^2\}$ to be the maximum value selected from the squared magnitude of the Fourier transform in the spatial dimension (among the Nc Range-Doppler matrices) of the frequency domain signal ($X(\omega_n)$) divided by the number of channels Nc. As a result of the coherent integration processing, the SNR is increased which enables the application of the computed CA-CFAR threshold 22 to detect both target peaks 23, 24. However, the use of the "maximum" selection function results prevents the ability of obtaining a precise probability of false alarm $P_{FA}$ with existing CFAR algorithms.

Figure 3:
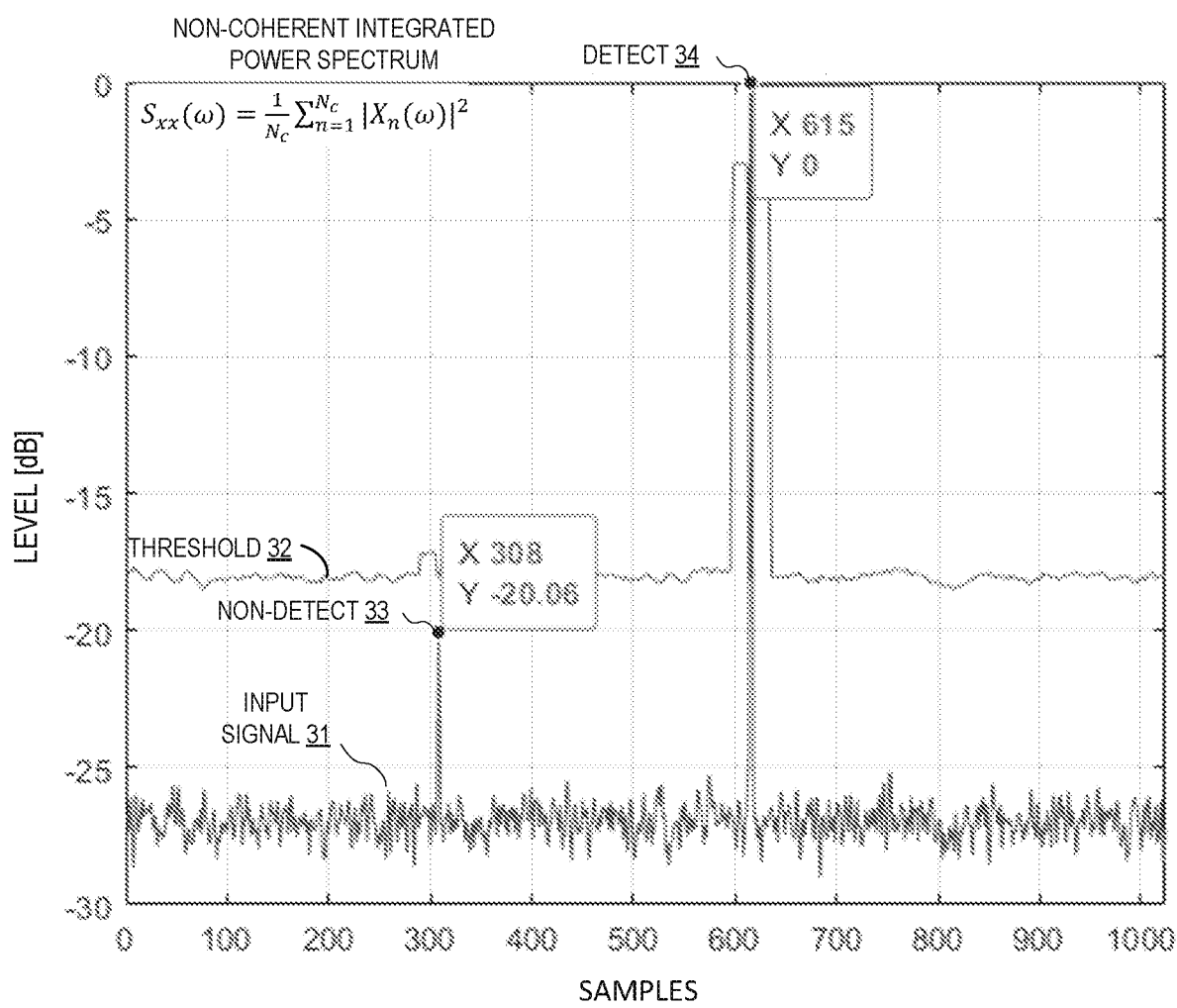
FIG. 3 depicts an example range profile for a CA-CFAR threshold that is applied to a non-coherently integrated range-compressed input signal for detecting two targets.

To provide additional details for an improved contextual understanding of the present disclosure, reference is now made to FIG. 3 which depicts an example range profile 30 where a computed CA-CFAR threshold 32 is applied to a non-coherently integrated range-compressed input signal 31 for detecting target peaks 33-34 for two targets located at distance samples 308 and 615. As will be understood by those skilled in the art, non-coherent integration (also referred to as non-coherent combining) is a compression technique which may be done via averaging the squared absolute values. In this example, the CFAR algorithm computes and applies the CA-CFAR threshold 32 to find the threshold(s) which will distinguish the peaks 33-34 generated by targets from the peaks generated by the input signal noise 31. As depicted in the non-coherently integrated power spectrum range profile 30, the input signal 31 is generated as $S_{xx}(\omega)=1/N_c\Sigma_{n=1}^{N_c}|X_n(\omega)|^2$. As a result of the non-coherent integration processing, the average value of the noise floor is not changed, but the variance is significantly decreased. As a result, applying the computed CA-CFAR threshold 32 can detect certain high SNR target peaks (e.g., 34), but certain lower SNR target peaks (e.g., 33) are masked.

Figure 4:
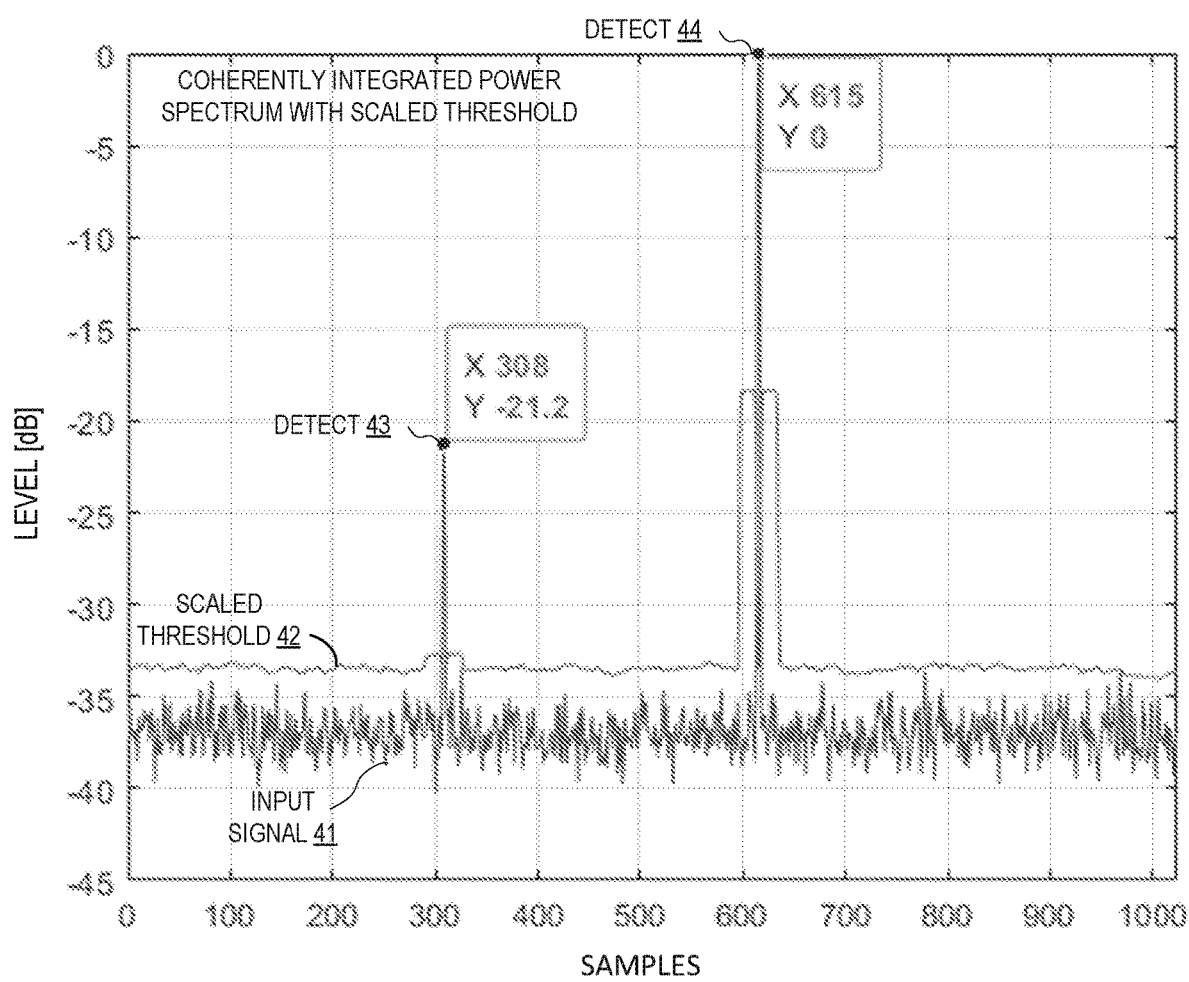
FIG. 4 depicts an example range profile for a scaled CA-CFAR threshold that is applied to a coherently integrated range-compressed input signal for detecting two targets in accordance with selected embodiments of the present disclosure.

To provide additional details for an improved understanding of selected embodiments of the present disclosure, reference is now made to FIG. 4 which depicts an example coherently integrated power spectrum range profile 40 where a scaled CA-CFAR threshold 42 is applied to a coherently integrated range-compressed input signal 41 for detecting target peaks 43-44 for two targets located at distance samples 308 and 615. As disclosed herein, the coherently integrated image input signal 41 may be generated from the Fourier transformed digital spatial domain signals (x(n)) that are output from the receiver channels by performing FFT in the spatial domain (among receive channels) and applying global maximum on the absolute values on the resulting data. In this example, the CFAR algorithm computes and applies the scaled CA-CFAR threshold 42 by first calculating a CFAR threshold $T_{CA}$ from the non-coherent integration data, and then applying a scaling factor $$\beta = -\frac{\ln\left(1 - \sqrt[N_c]{1-P_{FA}}\right)}{NN_c\left(P_{FA}^{-\frac{1}{N}} - 1\right)}$$

to compute a scaled CFAR threshold $T_{CA}'=\beta T_{CA}$. Once computed, the scaled CA-CFAR threshold 42 is applied to coherently integrated range-compressed input signal 41 to distinguish the peaks 43-44 generated by targets from the peaks generated by the input signal noise 41. As a result of using coherent integration data, the SNR for the targets 43, 44 is increased. In addition, both the average value and variance of the coherently integrated range-compressed input signal 41 is reduced (as compared to the power spectrum input signal 11). Finally, the scaled CA-CFAR threshold 42 is computed in a way that is less affected by the presence of high SNR targets to more closely fit the input signal 41 so that both target peaks 43, 44 are detected while maintaining the desired probability of false alarm $P_{FA}$. The scaling factor $\beta$ is applied in the same manner for both CA-CFAR and OS-CFAR.

Figure 5:
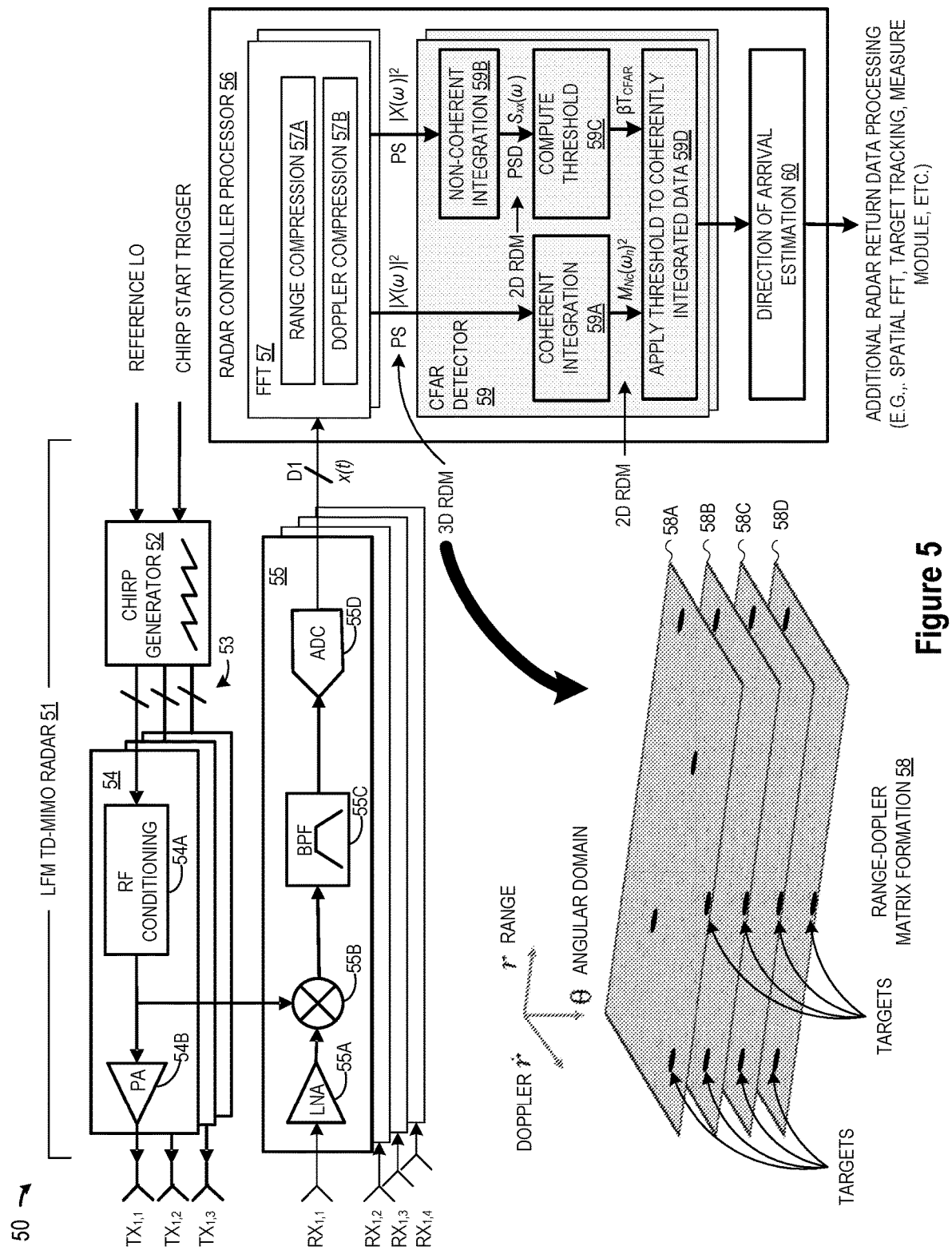
FIG. 5 is a simplified schematic block diagram of an LFM MIMO automotive radar system in accordance with selected embodiments of the present disclosure.

To illustrate the design and operation of an LFM MIMO automotive radar system in which CFAR phased array pre-processing uses non-coherent and coherent integration to detect target returns, reference is now made to FIG. 5 which depicts a simplified schematic block diagram of a Linear Frequency Modulation (LFM) time-division multiple-input, multiple output (TD-MIMO) automotive radar system 50 which includes an LFM TD-MIMO radar device 51 connected to a radar controller processor 56. In selected embodiments, the LFM TD-MIMO radar device 51 may be embodied as a line-replaceable unit (LRU) or modular component that is designed to be replaced quickly at an operating location. Similarly, the radar controller processor 56 may be embodied as a line-replaceable unit (LRU) or modular component. Although a single or mono-static LFM TD-MIMO radar device 51 is shown, it will be appreciated that additional distributed radar devices may be used to form a distributed or multi-static radar. In addition, the depicted radar system 50 may be implemented in integrated circuit form with the LFM TD-MIMO radar device 51 and the radar controller processor 56 formed with separate integrated circuits (chips) or with a single chip, depending on the application.

Each radar device 51 includes one or more transmitting antenna elements $TX_i$ and receiving antenna elements $RX_j$, connected, respectively, to one or more radio-frequency (RF) transmitter (TX) units 54 and receiver (RX) units 55. For example, each radar device (e.g., 51) is shown as including individual antenna elements (e.g., $TX_{1,i}$, $RX_{1,j}$) connected, respectively, to three transmitter modules (e.g., 54) and four receiver modules (e.g., 55), but these numbers are not limiting and other numbers are also possible, such as four transmitter modules 54 and six receiver modules 55, or a single transmitter module 54 and/or a single receiver module 55. Each radar device 50 also includes a chirp generator 52 which is configured and connected to supply a chirp input signal 53 to the transmitter module(s) 54. To this end, the chirp generator 52 is connected to receive a separate and independent local oscillator (LO) signal and a chirp start trigger signal, though delays are likely to be different due to the signal path differences and programmable digital delay elements in the signal paths. Chirp signals are generated and transmitted to multiple transmitters 54, usually following a pre-defined transmission schedule, where they are filtered at the RF conditioning module 54A and amplified at the power amplifier 54B before being fed to the corresponding transmit antenna $TX_{1,i}$ and radiated. By sequentially using each transmit antenna $TX_{1,i}$ to transmit successive pulses in the chirp signal, each transmitter element 54 operates in a time-multiplexed fashion in relation to other transmitter elements because they are programmed to transmit identical waveforms on a temporally separated schedule.

The radar system 50 also includes a radar controller processing unit 56 that is connected to supply input control signals to the radar device 51 and to receive therefrom digital output signals D1 generated in the time domain x(t) by the receiver modules 55. In selected embodiments, the radar controller processing unit 56 may be embodied as a micro-controller unit (MCU) or other processing unit that is configured and arranged for signal processing tasks such as, but not limited to, target identification, computation of target distance, target velocity, and target direction, and generating control signals. The radar controller processing unit 56 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar controller processor 56 may be configured to program the transmitter modules 54 to operate in a time-division fashion by sequentially transmitting LFM chirps for coordinated communication between the transmit antennas $TX_{1,i}$, $RX_{1,j}$.

In the example shown, each chirp generator 52 generates a chirp signal 53 in response to a chirp start trigger signal and a corresponding reference local oscillator signal (Reference LO). The resulting chirp signal 53 from each chirp generator 52 is then processed by the RF conditioning unit 54A and amplified at the power amplifier (PA) 54B which amplifies the signal to a level suitable for transmission as a radar signal by a transmitter antenna unit $TX_{1,i}$, $TX_{2,i}$. Though not shown, it will be understood that the transmitter module 54 may include additional processing circuits, such as a digital-to-analog converter (DAC), phase shifter (or phase rotator), buffer, mixer, filter, and the like.

The radar signal transmitted by the transmitter antenna unit $TX_{1,i}$ may be reflected by one or more objects (not shown), and part of the reflected radar signal reaches the receiver antenna units $RX_{1,i}$ at the radar device 51. At each receiver module 55, the received (radio frequency) antenna signal is amplified by a low noise amplifier (LNA) 55A and then fed to a mixer 55B where it is mixed with the transmitted chirp signal generated by the RF conditioning unit 54A. The resulting intermediate frequency signal is fed to a band-pass filter (BPF) 55C and may also be amplified and/or filtered with additional receive processing elements (not shown) before being fed to an analog/digital converter (ADC) 55D and output by each receiver module 55 as a digital signal D1. At the radar controller 56, the digital signal D1 is processed by the radar modules 57-59 to detect and measure target returns. In particular, the digital output signals D1 generated by the receiver module 55 may be processed with radar modules 57-59 to construct and accumulate multiple-input multiple-output (MIMO) array outputs to form a MIMO aperture for use in computing the plots generated with spatial (angle) FFT processing, target tracking processing, and other measurement processing.

For example, the digital output signals D1 may be processed by one or more fast Fourier transform (FFT) modules 57, such as a fast-time (range) FFT module and slow-time (Doppler) FFT module, thereby generating a three-dimensional range-Doppler map (RDM) 58 which is also called a radar cube having range-doppler-angle dimensions. And as described more fully hereinbelow, the RDM outputs are then passed through one or more CFAR detection modules 59 to obtain the range-Doppler peak detections for use in estimating the direction of arrival for the target return(s), along with spatial angle estimation processing, target tracking processing, and measurement processing, with the result being output to other automotive computing or user interfacing devices for further process or display.

With the depicted frequency modulated continuous wave (FMCW) modulation radar system 50, the digital output signal D1 from each receiver module or channel 55 is evaluated to detect target returns by first generating a range-compressed signal under test. In particular, the range compressed signal may be generated at the FFT module 57 by taking the Fourier Transform of the complex time domain output signal(s) x(t) acquired from the ADC 55D. While any suitable radar signal processing steps may be used, the radar controller 56 may include a range compression module 57A that is configured to perform fast-time FFT processing on the received radar signal to derive range information, and may also include a doppler compression module 57B that is configured to perform slow-time FFT processing on the received radar signal to derive Doppler information.

After doppler compression, each receive channel will contain information regarding a Range-Doppler Matrix (RDM) 58 which is formed with a plurality of Range-Doppler maps 58A-D generated by a corresponding plurality of receive channels. In each Range-Doppler map (e.g., 58A), each target is represented by a Point-Spread-Function (PSF) with the peak located at the range and Doppler shift corresponding to the target. As used herein, the terms "coherent" or "non-coherent" integration refer to the integration of all RDM in the angular domain, denoted with $\theta$ in FIG. 5. In addition, the total number of channels $N_c$ corresponds to the number of receive channels, and hence the number of RDMs available for combining.

To enable the use of existing CFAR algorithms to greatly increase the probability of detection, the CFAR detector 59 uses existing hardware resources (such as FFT accelerators and Square-Law or Log-Law detectors) to improve processing time and achieve higher angular resolution detection by pre-processing the RDM 58 to identify target detections that can be processed to estimate the direction of arrival, rather than processing the entire raw data of the RDM 59. To this end, the CFAR detector 59 includes a first coherent integration module 59A in a first processing path which coherently integrates or combines the RDM 58 in the spatial dimension (among receive channels) to improve target SNR before detection. In addition, the CFAR detector 59 includes a second non-coherent integration module 59B in a second, parallel processing path which non-coherently integrates or combines the RDM 58 by computing the average of the squared absolute values. The CFAR detector 59 also includes a threshold computation module 59C which computes a scaled CFAR threshold by using a defined scaling or mapping factor R that is applied to the CFAR threshold $T_{CFAR}$. At the threshold application module 59D, the scaled CFAR threshold is applied to the coherently integrated data generated by the coherent integration module 59A, thereby greatly reducing the chance of targets being masked by either noise or other targets. Finally, a direction of arrival estimation module 60 is connected and configured to process the targets identified by the CFAR detector 59 when estimating the direction of arrival for the detected target returns.

The reason for including two processing paths is to obtain the benefits, and avoid the drawbacks, from using coherently and non-coherently integrated data. For example, in applications with high target density (such as automotive applications), the application of existing CFAR thresholds to coherently integrated data can result in high SNR targets that can easily mask low SNR targets since the existing CFAR threshold is increased in their vicinity. As a result, existing CFAR threshold techniques are not well suited for use with coherently integrated data. The second issue is that the noise distribution does not have an analytical solution, making it impossible to mathematically derive a robust CFAR algorithm for such data. On the other hand, if non-coherent integration is used instead, a highly accurate estimate of the noise power can be obtained, but existing CFAR threshold techniques can result in the low SNR targets being masked by the noise floor.

To address both of these issues, the CFAR detector 59 includes separate, parallel processing paths and processor resources for performing coherent combining 59A and non-coherent combining 59B. For example, the first coherent integration module 59A may be executed by using an FFT accelerator to perform the coherent integration 59A, and the second non-coherent integration module 59B may be executed by using by using a DSP core to perform the non-coherent integration 59B. On this point, the FFT accelerator is able to quickly perform the coherent integration processing that would otherwise be too slow if implemented with a DSP core.

To understand how CFAR phased array pre-processing using non-coherent and coherent integration can increase the probability of detection $P_D$ while maintaining the probability of false alarm $P_{FA}$, the relationship between $P_D$ and $P_{FA}$ is now described with reference to the traditional CA-CFAR algorithm. However, it will be appreciated that the relation is similar for all CFAR algorithms.

Depending on whether there are targets present, there are two possible outcomes from generating the range-compressed signal under test. In the first outcome, there are no targets present, and the reflected radar signal includes only noise samples that may be characterized by the form $x_n = I_w + jQ_w$, where $I_w$ and $Q_w$ are random variables (r.v.) characterized by a Normal distribution $$N\left(0, \frac{\sigma_w^2}{2}\right).$$

If the reflected radar signal x is processed by a linear detector, the linear detector output gives the magnitude of x, which will result in a r.v. having a Rayleigh distributed probability density function (PDF). However, if the reflected radar signal x is processed by a square law detector, the resulting noise at the square law detector output $z = |x|^2$, and will have an exponential probability density function:

$$p_z(z) = \begin{cases} \frac{1}{\sigma_w^2} \exp\left(\frac{-z}{\sigma_w^2}\right) & , z \geq 0 \\ 0 & , z < 0 \end{cases}, \quad (1)$$

where $\sigma_w^2$ represents the noise variance.

In the second outcome where there are targets present, the reflected radar signal generates a square law detector output which follows a Rice distribution function:

$$p_Z(z) = \begin{cases} \frac{1}{\sigma_w^2} \exp\left(\frac{-z}{\sigma_w^2} + SNR\right) I_0\left(2\sqrt{SNR \frac{z}{\sigma_w^2}}\right) & , z \geq 0 \\ 0 & , z < 0 \end{cases} \quad (2)$$

where $I_0(x) = \sum_{n=0}^{\infty} \frac{(-1)^n}{2^{2n}(n!)^2} x^{2n}$ is the Bessel function of the first kind of order zero.

Assuming there is only noise (no targets) present in the analysis window, the Maximum likelihood estimate of the noise variance $\sigma_w^2$ is obtained from setting:

$$\frac{\partial \log\left(p_Z(z_n | \sigma_w^2)\right)}{\partial \sigma_w^2} = 0, \quad (3)$$

where $p_Z(z_n | \sigma_w^2) = \frac{1}{(\sigma_w^2)^N} \exp\left(\sum_{n=1}^{N} \frac{-z_n}{\sigma_w^2}\right).$ (4)

The resulting computation of the noise variance $\sigma_w^2$ as the mean of the noise samples is:

$$\hat{\sigma}_w^2 = \frac{1}{N} \sum_{n=1}^{N} z_n. \quad (5)$$

As a result, the CA-CFAR threshold $T_{CA}$ may be computed as:

$$T_{CA} = \hat{\sigma}_w^2 \alpha_{CA}, \quad (6)$$

where $\alpha_{CA}$ is a scaling constant depending on the desired probability of false alarm $P_{FA}$.

For a given $T_{CA}$, the probability of detection is:

$$P_D = \int_{T_{CA}}^{\infty} \frac{1}{\sigma_w^2(1+SNR)} \exp\left(\frac{-z}{\sigma_w^2(1+SNR)}\right). \tag{7}$$

Since the noise variance $\hat{\sigma}_w^2$ is a random variable, the computed probability of detection $\hat{P}_D(z)$ is also a random variable:

$$\hat{P}_D(\hat{\sigma}_w^2) = \exp\left(\frac{-T_{CA}}{\hat{\sigma}_w^2(1+SNR)}\right). \tag{8}$$

The average probability of detection $\overline{P}_D$ is obtained by taking the average with respect to the distribution of $\hat{\sigma}_w^2$:

$$\overline{P}_D = E\{\hat{P}_D(\hat{\sigma}_w^2)\} \rightarrow \int_0^\infty \hat{P}_D(\hat{\sigma}_w^2) p_{\hat{\sigma}_w^2}(\hat{\sigma}_w^2) d\hat{\sigma}_w^2, \tag{9}$$

where the pdf $p\hat{\sigma}_w^2(\hat{\sigma}_w^2)$ was chosen to model a Swerling 1 target.

As will be understood by those having ordinary skill in the art, the average value for the probability of detection $\overline{P}_D$ may be computed in the closed form solution as:

$$\overline{P}_D = \left[1 + \frac{\alpha_{CA/N}}{(1+SNR)}\right]^{-N}. \tag{10}$$

And by setting the SNR to zero, the average probability of false alarm $\overline{P}_{FA}$ may be computed as:

$$\overline{P}_{FA} = \left[1 + \frac{\alpha_{CA}}{N}\right]^{-N}. \tag{11}$$

Solving for $\alpha_{CA}$, the scaling constant value may be computed as:

$$\alpha_{CA} = N[P_{FA}^{-1/N} - 1]. \tag{12}$$

As seen from the foregoing sequence of calculations, it is seen that $\alpha_{CA}$ is a constant that does not depend on z. It plays the role of a parameter to set the desired $P_{FA}$. In addition, it is seen that:

$$\overline{P}_{FA} = \overline{P}_{D|SNR=0} \tag{13}$$

This is valid for any type of CFAR algorithm. Using a different CFAR algorithm will result in a different form of Equation (10), but this has no impact on Equation (13).

While Equations (1)-(13) make sense for single target detection scenarios, multi-target scenarios present situations where there is a high probability for a target to be present within the N samples used for computing the estimated noise variance $\hat{\sigma}_w^2$. Applying the CFAR algorithm on non-coherently integrated RDM data (instead of coherently integrated RDM data) will significantly reduce the SNR of the targets, resulting in a better estimate of the noise variance $\hat{\sigma}_w^2$ from Equation (5). As a result, the CFAR detector 59 connects the threshold computation module 59C to the output of the non-coherent integration module 59B so that the estimated noise average, $\hat{\sigma}_w^2$ is computed from the non-coherently integrated data. In this way, the threshold computation module 59C is connected and configured to construct a CFAR threshold that is applied to the coherently integrated data by the threshold application module 59D.

As shown in FIG. 5, the Fourier transform module(s) 57 are connected to acquire and process the time-domain signals captured by each ADC at a receiver channel by performing range-doppler compression on the digital output signals D1. In addition, the CFAR detector 59 is connected to process the Power Spectrum (PS) output from the Fourier transform module(s) 57 using any suitable detector, such as a square-law, linear or log detector. For simplicity, the CFAR detector 59 is described as using a square-law detector. To further simplify notations, the Doppler dimension can be ignored. With these assumptions, the Power Spectrum of the three-dimensional RDM output from the Fourier transform module(s) 57 is defined as:

$$|X(\omega)|^2 = |F\{x(t)\}|^2 \tag{14}$$

After non-coherently combining the three-dimensional RDM output from the Fourier transform module(s) 57 with the non-coherent integration module 59B, a two-dimensional RDM is generated which may be characterized by a Power Spectral Density (PSD) measure. As disclosed herein, the Power Spectral Density measure is mathematically defined as the statistical average of the Power Spectrum, and is similar to the output of a Spectrum Analyzer which averages all frequency components over a given span within a period of time proportional to the resolution bandpass filter's group delay. The theoretical Power Spectral Density is thus defined as:

$$S_{xx}(\omega) = \lim_{N_c \to \infty} \frac{1}{L} \sum_{n=1}^{N_c} |X_n(\omega)|^2 = E[|X(\omega)|^2] \tag{15}$$

where $N_c$ is the number of receive channels. Although the Power Spectrum and Power Spectral Density are commonly mistaken to be the same, the difference between the two is extremely important, because $|X(\omega)|^2$ is a random process, but $S_{xx}(\omega)$ is deterministic, as it represents the average over multiple realizations of $|X(\omega)|^2$. The only exception is when dealing with purely deterministic signals, in which case both the Power Spectrum and Power Spectral Density measures are equal.

To further describe the statistics of the non-coherent integration, it is understood that, for most detection radar applications, the following are generally true in a noise/clutter-only environment. First, the time domain signal x(t) has real and imaginary Gaussian distributed components, where the variance is $\sigma_w^2/2$ and the mean is 0. In addition, the Power Spectrum signal $|X(\omega)|^2$ is exponentially distributed, where the variance is $\sigma_w^4$ and the mean is $\sigma_w^2$. Finally, the Power Spectral Density (non-coherent integration) signal $S_{xx}(\omega)$ has a Gaussian distribution (according to the Central Limit Theorem), where the variance is $\sigma_w^4/N_c$ and the mean is $\sigma_w^2$.

As for coherent integration processing, instead of averaging between realizations (like in Equation (15)), the coherent integration module 59A may be configured to compute the Fourier transform among each realization signal received from a different receive channel, and then to generate the coherent integrated spectrum by taking the maximum value from each of the spatial FFTs:

$$M_{N_c}(\omega_n) = \max\{|F\{X(\sigma_n)\}|^2\} = \max\{|X(\theta)|^2\} \tag{16}$$

where $X(\theta)$ is the Fourier transform of $X(\omega_n)$ in the spatial domain (among receive channels), and where $\omega_n$ represents the n'th frequency bin of $\omega$. As will be appreciated, Equation (16) is not to be confused with Equation (14), where $X(\omega)$ represents the Fourier transform of the time-domain signal, x(t). In addition, it should be noted that, in this case, the subscript in $M_{N_c}$ is NOT an index, but instead represents the number of elements applied to the max{ } operator, which for the present disclosure is the number of FFT points used in the spatial domain.

For coherent integration, the probability that a noise sample is smaller than some threshold T is given by the joint cumulative distribution function:

$$P_r(M_{N_c} < T) = P_r(|X_1(\theta)|^2 < T, |X_2(\theta)|^2 < T, \ldots |X_{N_c}(\theta)|^2 < T). \quad (17)$$

Upon assuming that all samples are independent and identically distributed random variables (i.i.d.r.v.), this results in the product of all cumulative functions:

$$P_r(M_{N_c} < T) = (\int_0^T (\exp(-\Omega)) d\Omega)^{N_c}. \quad (18)$$

In Equation (18), the normalized distribution having $\sigma_w^2 = 1$ will be used for notation simplicity. $M_{N_c}$ is Exponential-Extreme Distributed.

As will be appreciated, an extremely accurate value for the noise variance $\sigma_w^2$ can be obtained by applying a sliding window average or sort on the PSD obtained from the non-coherent integration module 59B. However, if the CFAR threshold computed from the coherently integrated data, the desired probability of false alarm $P_{FA}$ cannot be robustly achieved since the noise floor and noise properties will have been significantly modified by the coherent integration process.

To address these limitations from existing CFAR threshold computation algorithms, the threshold computation module 59C is connected and configured to construct a new CFAR threshold that can maintain the desired $P_{FA}$ when applied to the SNR-boosted coherently integrated power spectrum, while maximizing the probability of detection $P_D$. The derivation of the scaling factor 3 is achieved using the CA-CFAR algorithm, however the result may then be used for any other type of CFAR algorithm, e.g. the OS-CFAR. The first step in the derivation process is setting T in Equation (18) equal to $N_c T_{CA}$ (where $T_{CA}$ is the traditional CA-CFAR threshold) and matching the probability of detection $P_D$ in a "noise only" environment to $P_{FA}$. This is equivalent to setting the probability that $M_{N_c}$ is beneath the threshold to $1-P_{FA}$, as shown below:

$$P_r(M_{N_c} \leq N_c T_{CA}) = 1 - P_{FA}. \quad (19)$$

Using the threshold $T_{CA}$ that was previously calculated from the non-coherently integrated data set as $T_{CA} = N(P_{FA}^{-1/N} - 1)\sigma_w^2$, Equation (19) can be rewritten as:

$$P_r(M_{N_c} \leq N_c N(P_{FA}^{-1/N} - 1)\hat{\sigma}_w^2) = 1 - P_{FA}. \quad (20)$$

Because all parameters are constant (apart from the random variables $M_{N_c}$ and $\sigma_w^2$), the only way to satisfy Equation (20) is to introduce a scaling factor $\beta$, such that:

$$P_r\left(M_{N_c} \leq \beta N_c N\left(P_{FA}^{-\frac{1}{N}} - 1\right)\sigma_w^2\right) = 1 - P_{FA}. \quad (21)$$

To find a solution for $\beta$ that will allow the original $T_{CA}$ to be scaled such that the $P_{FA}$ is constant when applied to the coherently integrated data, both sides of the argument are divided by $\sigma_w^2$, as shown below:

$$P_r\left(\frac{M_{N_c}}{\sigma_w^2} \leq \beta N_c N\left(P_{FA}^{-1/N} - 1\right)\right) = 1 - P_{FA}. \quad (22)$$

As will be noted, the term $\beta N(P_{FA}^{-1/N}-1)$ is a deterministic constant which does not depend on the signal. Although less obvious, the term $$\frac{M_{N_c}}{\sigma_w^2}$$

only depends on the shape of the distribution and is independent of $\sigma_w^2$. Therefore, the problem simplifies to finding $\beta$ from the following equation:

$$\left(\int_0^{\beta N_c N\left(P_{FA}^{-\frac{1}{N}} - 1\right)} (\exp(-\Omega)) d\Omega\right)^{N_c} = 1 - P_{FA}. \quad (23)$$

Solving the integral, Equation (20) becomes:

$$\left(1 - \exp\left(-\beta N N_c\left(P_{FA}^{-\frac{1}{N}} - 1\right)\right)\right)^{N_c} = 1 - P_{FA}. \quad (24).$$

Finally, the closed form solution of the scaling factor $\beta$ (Equation (29)) may be found with the following sequence of calculations:

$$1 - \exp\left(-\beta N N_c\left(P_{FA}^{-\frac{1}{N}} - 1\right)\right) = \sqrt[N_c]{1 - P_{FA}}, \quad (25)$$

$$\exp\left(-\beta N N_c\left(P_{FA}^{-\frac{1}{N}} - 1\right)\right) = 1 - \sqrt[N_c]{1 - P_{FA}}, \quad (26)$$

$$-\beta N N_c\left(P_{FA}^{-\frac{1}{N}} - 1\right) = \ln\left(1 - \sqrt[N_c]{1 - P_{FA}}\right), \quad (27)$$

$$\beta = -\frac{\ln\left(1 - \sqrt[N_c]{1 - P_{FA}}\right)}{N N_c\left(P_{FA}^{-\frac{1}{N}} - 1\right)}, \quad (28)$$

$$\beta = -\frac{\ln\left(1 - \sqrt[N_c]{1 - P_{FA}}\right)}{\alpha_{CA} N_c}. \quad (29)$$

As seen from Equation (29), the scaling factor $\beta$ estimate is computed for a given set of parameters, including Probability of false alarm ($P_{FA}$), Window Size (N), and Number of Channels ($N_C$). As a result, the threshold computation module 59C may be configured to compute a new or scaled CFAR threshold $T'_{CA}$ that will be applied to the coherently integrated data. Using the noise variance $\hat{\sigma}_w^2$ term and CA-CFAR threshold $T_{CA}$ from Equations (5)-(6), the scaled CFAR threshold $T'_{CA} = \beta T_{CA}$ may be computed as:

$$T'_{CA} = \beta \alpha_{CA} \hat{\sigma}_w^2 = -\frac{\ln\left(1 - \sqrt[N_c]{1 - P_{FA}}\right)}{N N_c} \sum_{n=1}^{N} z_n. \quad (30)$$

In selected embodiments, the scaling factor parameter $\beta$ may be computed offline and can be included in $\alpha_{CA}$, thereby adding no numerical complexity to the CFAR algorithm.

For OS-CFAR algorithms, the scaling factor parameter $\beta$ is computed in the same way using Equation (28). In such embodiments, the threshold computation module 59C may be configured to compute a new or scaled OS-CFAR threshold $T'_{OS}$ as:

$$T'_{OS} = \beta \alpha_{OS} z_k, \quad (31)$$

where $z_k$ is the k'th largest value, and k is chosen to satisfy Equation (32). The traditional OS-CFAR scaling factor, $\alpha_{OS}$, is numerically found from Equation (32).

$$P_{FA} = k \binom{N}{k} (k-1)! \frac{(T_{OS} + N - k)!}{(T_{OS} + N)!}. \quad (32)$$

For an improved contextual understanding of selected embodiments of the present disclosure, reference is now made to FIGS. 6-9 which depict different range profiles illustrating the application of CA-CFAR thresholds for detecting multiple targets, including closely spaced high SNR and low SNR targets. In the example range profiles, there are four targets located at distance samples 101, 513, 610 and 630, with a high SNR target (at distance sample 610) being closely located next to the lower SNR target (at distance sample 610). The example range profiles were simulated based on a the following parameter values, $P_{FA}=0.001$, Window Size (N)=32, and Number of Channels ($N_C$)=192.

Figure 6:
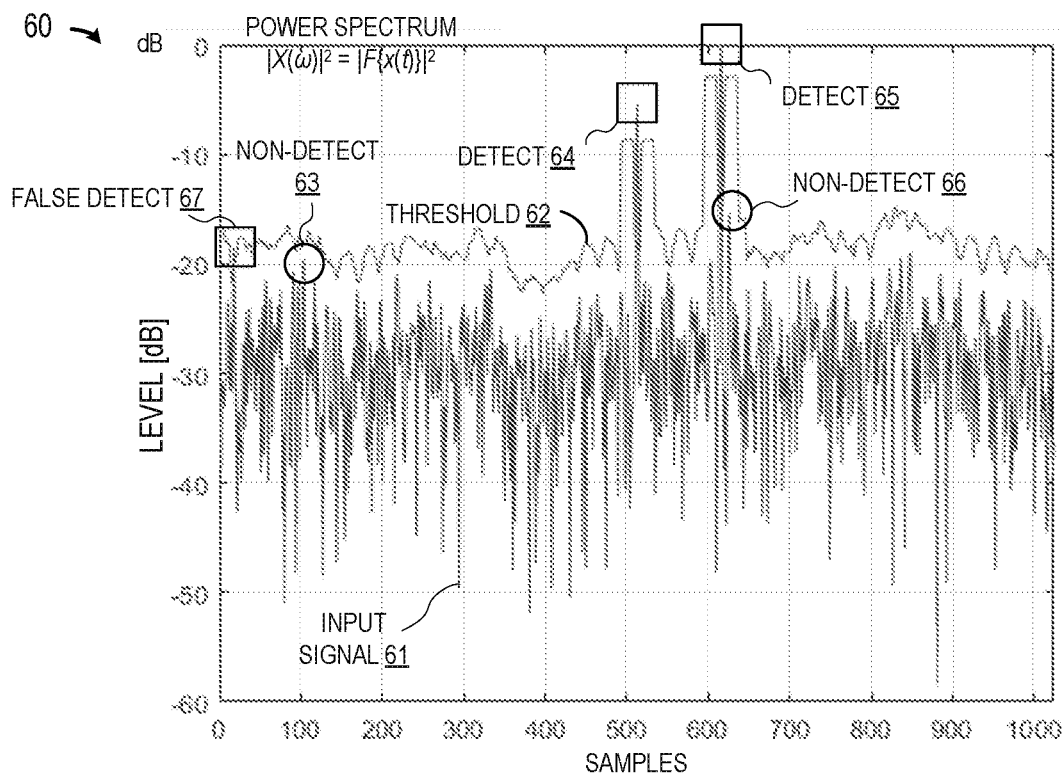
FIG. 6 depicts an example range profile for a CA-CFAR threshold that is applied to a range-compressed input signal for detecting multiple targets, including closely spaced high SNR and low SNR targets.

Turning first to FIG. 6, there is depicted an example power spectrum range profile 60 for a single receiver channel having a specified probability of false alarm (e.g., $P_{FA}=10^{-3}$) where a computed CA-CFAR threshold 62 is applied to a range-compressed input signal 61 for detecting multiple targets, including closely spaced high SNR and low SNR targets. The power spectrum range profile 60 represents the original noise floor, and the CFAR algorithm computes the CA-CFAR threshold 62 as the product of (1) a pre-computed scaling factor that depends on the desired probability of false alarm $P_{FA}$ and the assumed noise distribution, and (2) the estimated noise variance $\sigma_w^2$. As depicted in the example power spectrum range profile 60, the range-compressed input signal 61 is generated as $|X(\omega)|^2 = |F\{x(t)\}|^2$ to be the squared magnitude of the Fourier transform of the digital time domain signal (x(t)) that is output from the receiver channel. Since the CFAR algorithm generally assumes an exponential distribution of the range-compressed input signal 61, the variance of the noise is proportional to the average value of the input signal 61, and therefore has a relatively large and "wiggly" variation. As a result of the large variance, the computed CA-CFAR threshold 62 correctly detects certain high SNR target peaks (e.g., 64-65), but masks and fails to detect certain low SNR target peaks (e.g., 63, 66). In addition, there is a non-zero probability of a false detection associated with application of the computed CA-CFAR threshold 62 to the power spectrum input signal 61, as indicated with the false detection 67 that is cause when a noise sample is detected.

Figure 7:
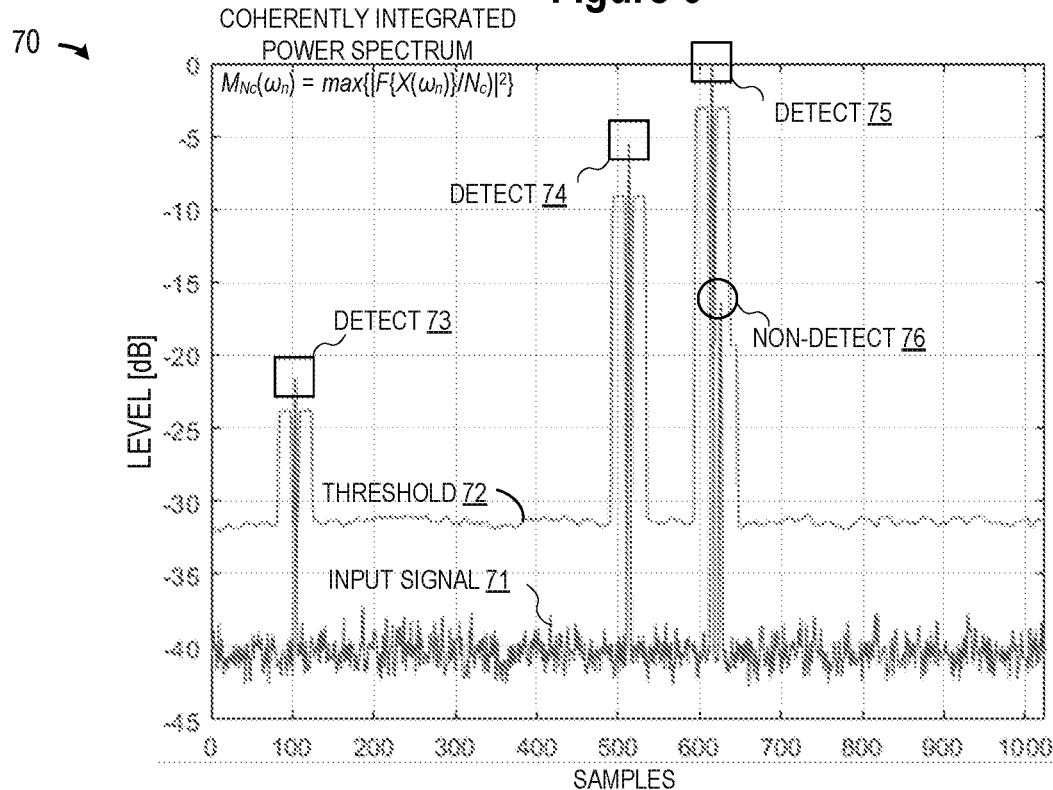
FIG. 7 depicts an example range profile for a CA-CFAR threshold that is applied to a coherently integrated range-compressed input signal for detecting multiple targets, including closely spaced high SNR and low SNR targets.

Turning now to FIG. 7, there is depicted an example range profile 70 where a computed CA-CFAR threshold 72 is applied to a coherently integrated range-compressed input signal 21 for detecting multiple targets, including closely spaced high SNR and low SNR targets. As depicted in the coherently integrated power spectrum range profile 70, the input signal 71 is generated as $M_{Nc}(\omega_n) = \max\{|F\{X(\omega_n)\}/N_c|^2\}$ to be the maximum value selected from the squared magnitude of the Fourier transform of the frequency domain signal ($X(\omega_n)$) divided by the number of channels $N_c$. As a result of the coherent integration processing, the SNR is increased for targets at distance samples 101, 513, 610 and 630. In addition to reducing the variance of the coherently integrated range-compressed input signal 71, the effective noise floor for which the probability of false alarm is calculated is reduced by $10 \log_{10}(\beta)$. As a result, the computed CA-CFAR threshold 72 can detect three of the target peaks 73-75, but not the lower SNR peak 76 that is close to the high SNR peak 75.

Figure 8:
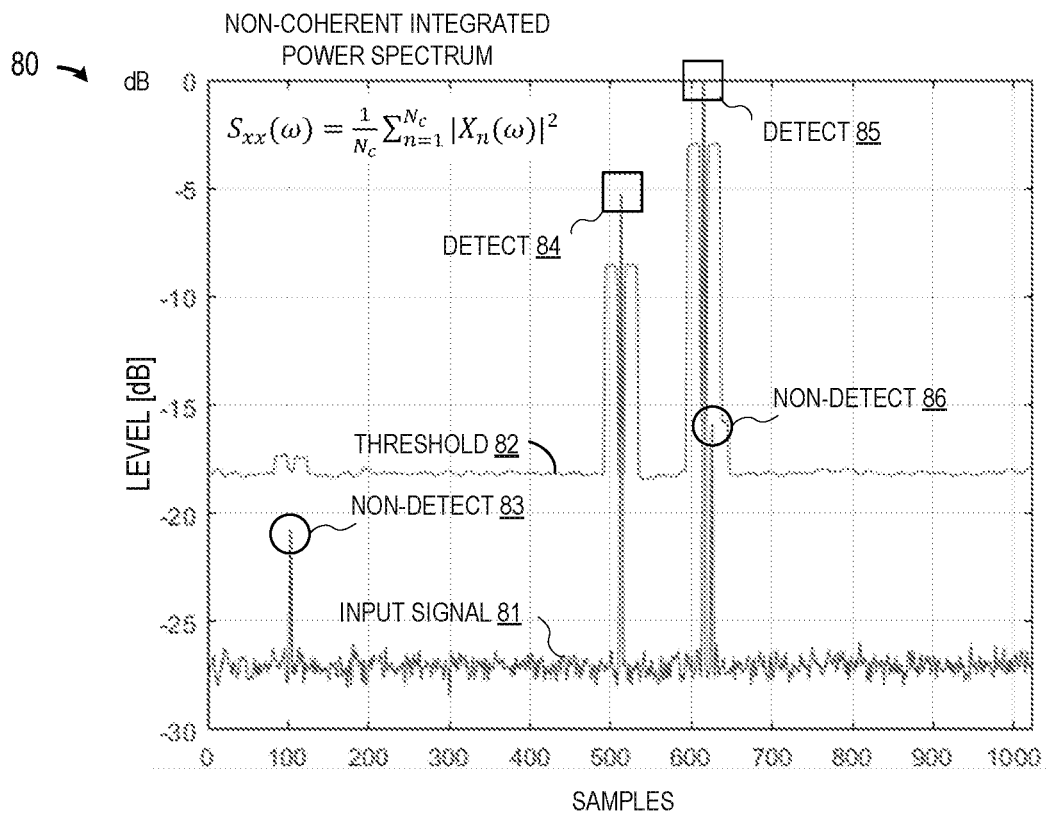
FIG. 8 depicts an example range profile for a CA-CFAR threshold that is applied to a non-coherently integrated range-compressed input signal for detecting multiple targets, including closely spaced high SNR and low SNR targets.

Turning now to FIG. 8, there is depicted an example range profile 80 where a computed CA-CFAR threshold 82 is applied to a non-coherently integrated range-compressed input signal 81 for detecting multiple targets, including closely spaced high SNR and low SNR targets. As depicted in the non-coherently integrated power spectrum range profile 80, the input signal 81 is generated as $$S_{xx}(\omega) = \frac{1}{N_c} \sum_{n=1}^{N_c} |X_n(\omega)|^2.$$

As a result of the non-coherent integration processing, the average noise level is unchanged for the targets at distance samples 101, 513, 610 and 630. However, the variance of the noise 81 is reduced which may be viewed as an artificial increase in SNR. As a result, the computed CA-CFAR threshold 82 can detect two of the target peaks 84-85, but not the lower SNR peak 83 that is masked by the CA-CFAR threshold 82 or the lower SNR peak 86 that is close to the high SNR peak 85.

Figure 9:
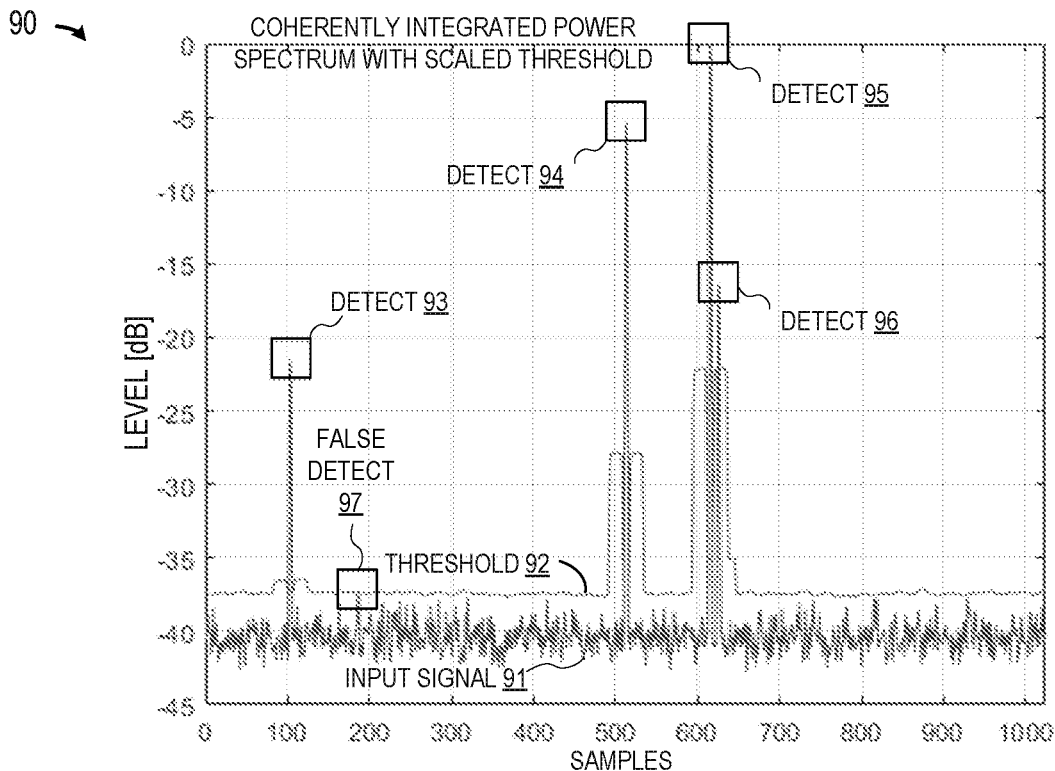
FIG. 9 depicts an example range profile for a scaled CA-CFAR threshold that is applied to a coherently integrated range-compressed input signal for detecting multiple targets, including closely spaced high SNR and low SNR targets in accordance with selected embodiments of the present disclosure.

Turning now to FIG. 9, there is depicted an example range profile 90 for a scaled CA-CFAR threshold 92 that is applied to a coherently integrated range-compressed input signal 91 for detecting multiple targets, including closely spaced high SNR and low SNR targets. As disclosed herein, the input signal 91 is generated as $M_{Nc}(\omega_n) = \max\{|F\{X(\omega_n)\}/N_c|^2\}$ to be the maximum value selected from the normalized squared magnitude of the Fourier transform of the frequency domain signal ($X(\omega_n)$), where the normalization factor is the number of channels $N_c$. In addition, the CFAR algorithm computes and applies the scaled CA-CFAR threshold 92 by first calculating a CFAR threshold $T_{CA}$ from the non-coherent integration data, and then applying a scaling factor $$\beta = -\frac{\ln\left(1 - \sqrt[N_c]{1 - P_{FA}}\right)}{NN_c\left(P_{FA}^{-\frac{1}{N}} - 1\right)}$$

to compute a scaled CFAR threshold $T_{CA}' = \beta T_{CA}$. Once computed, the scaled CA-CFAR threshold 92 is applied to coherently integrated range-compressed input signal 91 to distinguish all four peaks 93-96 generated by targets from the peaks generated by the input signal noise 91. As a result of using coherent integration data, the SNR for the targets 93-94 is increased. In addition, both the average value and variance of the coherently integrated range-compressed input signal 91 is reduced. Finally, the scaled CA-CFAR threshold 92 is computed in a way that is less affected by the presence of high SNR targets to more closely fit the input signal 91 so that all four target peaks 93-96 are detected while maintaining the desired probability of false alarm $P_{FA}$. In addition, there is a non-zero probability of a false detection associated with application of the computed CA-CFAR threshold 92 to the power spectrum input signal 91, as indicated with the false detection 97 that is caused when a noise sample is identified as a detection.

Figure 10:
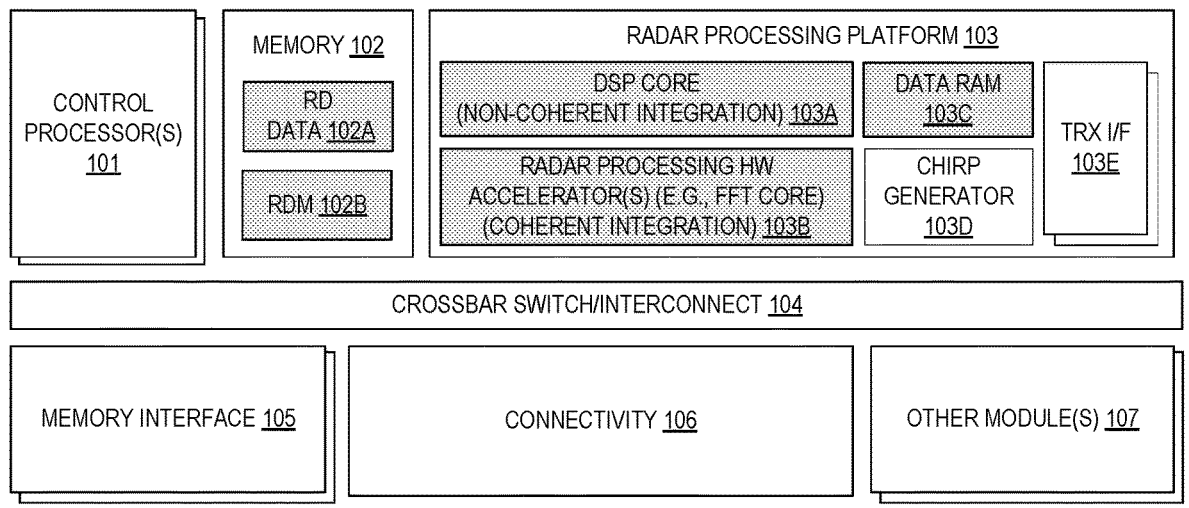
FIG. 10 is a simplified architectural block diagram of a microcontroller system for automotive and industrial high-performance radar applications in accordance with selected embodiments of the present disclosure.

To provide additional details for an improved understanding of selected embodiments of the present disclosure, reference is now made to FIG. 10 which illustrates a simplified architectural block diagram of a microcontroller 100 for automotive and industrial high-performance radar applications which may implement the disclosed system, apparatus, and methodology for detecting one or more targets with a cell average-constant false alarm rate detector. An example implementation, the microcontroller may be implemented with the NXP S32R45 radar MPU which provides high performance imaging radar as a 32-bit automotive radar microprocessor unit (MPU) based on DSP, Arm® Cortex®, and FFT accelerator cores within a single chip.

As depicted, the microcontroller 100 includes one or more control processor or central processing unit (CPU) subsystems 101, on-chip memory 102 (e.g., volatile or non-volatile memory), and radar processing platform 103 for providing radar-specific high throughput signal processing. For example, the radar processing platform 103 may include one or more digital signal processor (DSP) cores 103A, one or more radar processing hardware accelerators 103B, a data RAM 103C, a chirp generator 103D, and a transceiver interface 103E to provide transmit and receive module control and processing. The processor(s) 101, on-chip memory 102, and radar processing platform 103 may be connected over an on-chip interconnect 104 to a memory interface 105, (e.g., DDR interface), one or more connectivity modules 106 (e.g., PCIe 2x, FlexPWM, eTimer, IIC, DSPI, etc.), and other modules 107. In selected embodiments, the microcontroller 100 may be implemented as circuitry on a single integrated circuit or system-on-chip (SoC). In addition, the interconnect 104 can be any type of bus structure, including but not limited to a non-coherent interconnect, an advanced high-performance bus (AHB), or an advanced peripheral bus (APB). In addition, the control processor(s) 101 may be any type of processing circuit, including but not limited to a microprocessor (MPU), microcontroller (MCU), digital signal processor (DSP), or another type of processor or processor core with multiple levels of cache memory. Though not shown, the microcontroller 100 may include peripheral devices or special-purpose processors, communication interfaces, timers, encoders/decoders, and one or more external memory interfaces, such as DDR interface or flash interface. In turn, the external memory interfaces may be connected to external memory, such as DDR memory or flash memory.

As disclosed, the microcontroller 100 may use the control processor(s) 101 to provide a signal processing toolbox (SPT) which receives digital output signals from the radar processing platform 103 which uses the modules 103A-E to process received radar return signals by applying signal conditioning (e.g., low noise amplification, low/high pass filtering, and analog-to-digital conversion) and signal analysis (e.g., gain, windowing, FFT, and filtering). The resulting digital output signals are then processed by the control processor(s) 101 for detection and tracking to detect one or more targets. In particular, the control processor(s) may execute control code instructions for a CA-CFAR log detector algorithm which processes range and/or doppler compressed RDM data in parallel with both coherent and non-coherent integration processes. In selected embodiments, the control code instructions for a CA-CFAR log detector algorithm may be executed by the DSP core 103A to process the range and/or doppler compressed RDM data with a non-coherently combining process to generate non-coherently integrated data that is used to estimate an extremely precise CFAR threshold by calculating a CFAR threshold $T_{CA}$ or $T_{OS}$ from the non-coherent integration data, and then applying a scaling factor $$\beta = -\frac{\ln\left(1 - \sqrt[N_c]{1 - P_{FA}}\right)}{NN_c\left(P_{FA}^{-\frac{1}{N}} - 1\right)}$$

to compute a scaled CFAR threshold $T_{CA}'=\beta T_{CA}$, or $T_{OS}'=\beta T_{OS}$ In addition, an FFT accelerator from the radar processing hardware accelerators 103B may process the range and/or doppler compressed RDM data with a coherently combining process to generate coherently integrated data. In addition, the control code instructions for a CA-CFAR log detector algorithm may be executed by the control processor(s) 101 and/or DSP core 103A to apply the scaled CFAR threshold $T_{CA}'$ or $T_{OS}'$ to the coherently integrated data by comparing each cell under test with the corresponding scaled CFAR threshold $T_{CA}'$ or $T_{OS}'$ threshold to detect targets from any input data that exceeds the CA-CFAR or OS-CFAR threshold, respectively, thereby maximizing the probability of detection without degrading the probability of false alarm.

By separately processing the coherent combining and the non-coherent in parallel, the microcontroller 100 maximizes the efficiency CFAR detection processing. In particular, the range/doppler compressed data 102A may be retrieved as a 3D RDM from the memory 102 for storage in the data RAM 103C. Once loaded in the data RAM 103C, the 3D RDM is processed in parallel by performing non-coherent integration on the DSP core 103A while simultaneously performing coherent integration using the FFT accelerator in the radar processing hardware accelerator 103B. The resulting non-coherent integrated data (generated by the DSP core 103A) and the coherent integrated data (generated by the FFT accelerator 103B) may be stored in the memory 102 and/or data RAM 103C as two-dimensional range-doppler matrices 102B where additional CFAR detection processing is performed. Without using the FFT accelerator to perform coherent combining, the CFAR detection processing would be rather slow.

For an improved contextual understanding of selected embodiments of the present disclosure, reference is now made to FIGS. 11-14 which depict different range profiles illustrating the application of CFAR thresholds for detecting multiple targets, including three closely spaced high SNR targets. In the example range profiles, there are four targets located at distance samples 288, 299, 308 and 615, with three high SNR targets (at distance samples 288, 299, 308) being closely located next to one another. The example range profiles were simulated based on the following parameter values, $P_{FA}=0.001$, Window Size (N)=32, and Number of Channels ($N_C$)=192.

Figure 11:
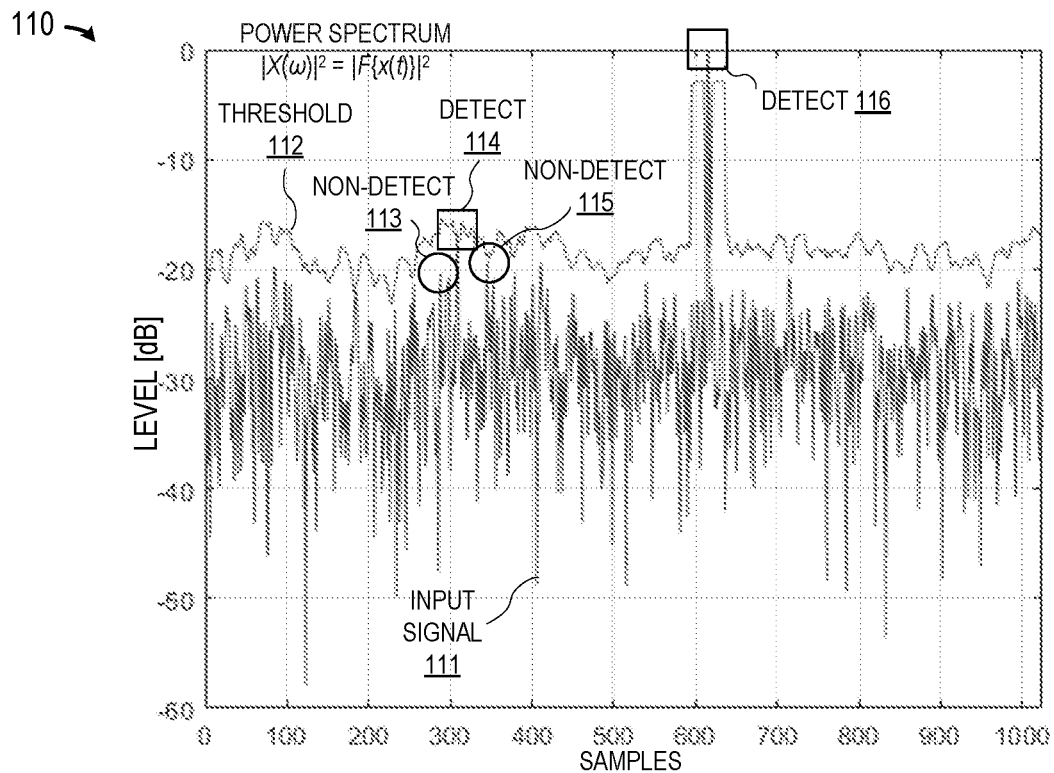
FIG. 11 depicts an example range profile for a CA-CFAR threshold that is applied to a range-compressed input signal for detecting multiple targets, including three closely spaced high SNR targets.

Turning first to FIG. 11, there is depicted an example power spectrum range profile 110 for a single receiver channel having a specified probability of false alarm where a computed CA-CFAR threshold 112 is applied to a range-compressed input signal 111 for detecting multiple targets, including three closely spaced high SNR targets. As depicted in the example power spectrum range profile 110, the range-compressed input signal 111 is generated as $|X(\omega)|^2=|F\{x(t)\}|^2$ to be the squared magnitude of the Fourier transform of the digital time domain signal (x(t)) that is output from the receiver channel. Since the CFAR algorithm generally assumes an exponential distribution of the range-compressed input signal 111, the variance of the noise is proportional to the average value of the input signal 111, and therefore has a relatively large and "wiggly" variance. As a result of the large variance, the computed CA-CFAR threshold 112 correctly detects certain high SNR target peaks (e.g., 114, 116), but masks and fails to detect certain low SNR target peaks (e.g., 113, 115).

Figure 12:
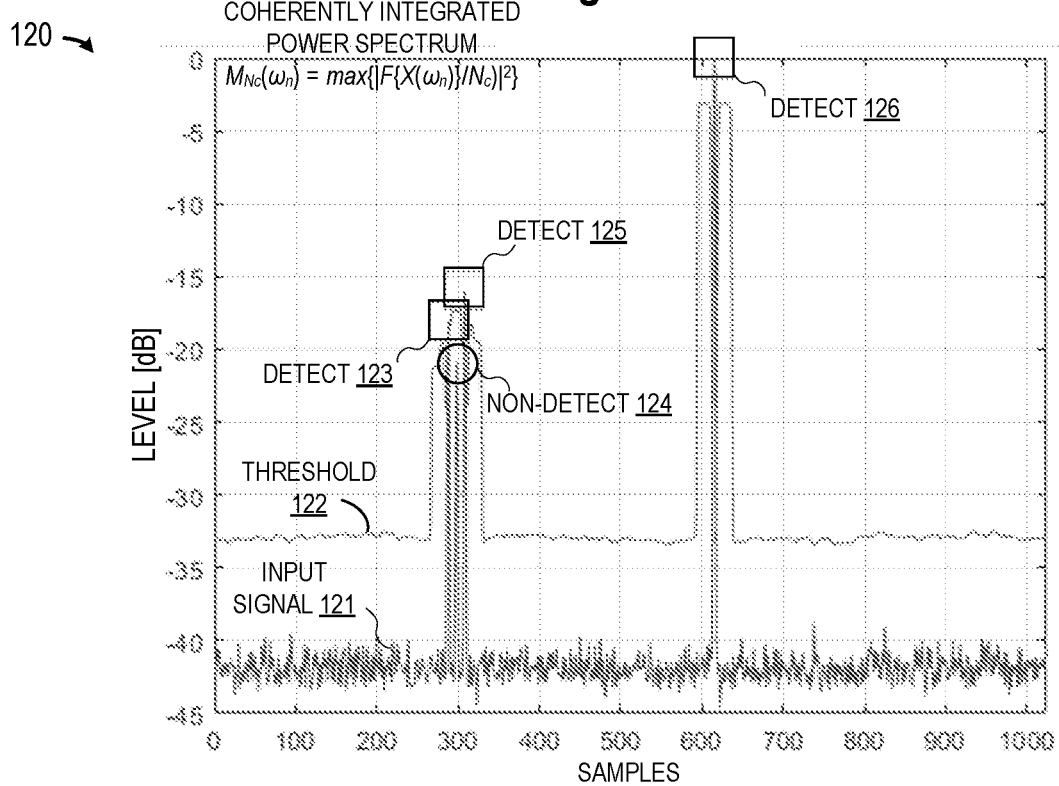
FIG. 12 depicts an example range profile for a CA-CFAR threshold that is applied to a coherently integrated range-compressed input signal for detecting multiple targets, including three closely spaced high SNR targets.

Turning now to FIG. 12, there is depicted an example range profile 120 where a computed CA-CFAR threshold 122 is applied to a coherently integrated range-compressed input signal 121 for detecting multiple targets, including three closely spaced high SNR targets. As depicted in the coherently integrated power spectrum range profile 120, the input signal 121 is generated as $M_{Nc}(\omega_n)=\max\{|F\{X(\omega_n)\}/N_c|^2\}$ to be the maximum value selected from the normalized squared magnitude of the Fourier transform of the frequency domain signal ($X(\omega_n)$), where the normalization factor is the number of channels $N_c$. As a result of the coherent integration processing, the SNR is increased for targets at distance samples 288, 299, 308 and 615. In addition to reducing the variance of the coherently integrated range-compressed noise 121, the coherent integration or combining reduces the noise floor by $10 \log_{10}(\beta)$. As a result, the computed CA-CFAR threshold 122 can detect three of the target peaks 123, 125, and 126, but not the lower SNR peak 124 that is close to the high SNR peaks 123, 125.

Figure 13:
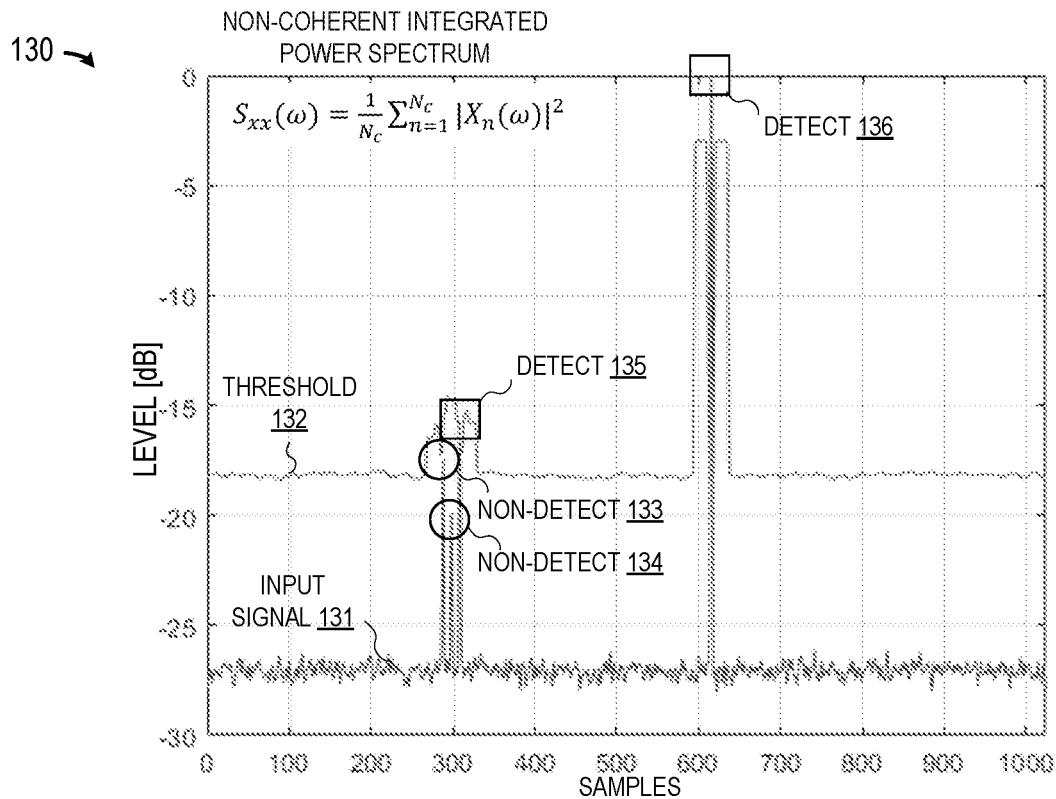
FIG. 13 depicts an example range profile for a CA-CFAR threshold that is applied to a non-coherently integrated range-compressed input signal for detecting multiple targets, including three closely spaced high SNR targets.

Turning now to FIG. 13, there is depicted an example range profile 130 where a computed CA-CFAR threshold 132 is applied to a non-coherently integrated range-compressed input signal 131 for detecting multiple targets, including three closely spaced high SNR targets. As depicted in the non-coherently integrated power spectrum range profile 130, the input signal 131 is generated as $$S_{xx}(\omega) = \frac{1}{N_c} \sum_{n=1}^{N_c} |X_n(\omega)|^2.$$

As a result of the non-coherent integration processing, there is no change to the average noise level, but the variance of noise affecting the input signal 131 is reduced. As a result, the computed CA-CFAR threshold 132 can detect two of the target peaks 135, 136, but not the two lower SNR peak 133, 134 that are close to the high SNR peak 135 and masked by the CA-CFAR threshold 132.

Figure 14:
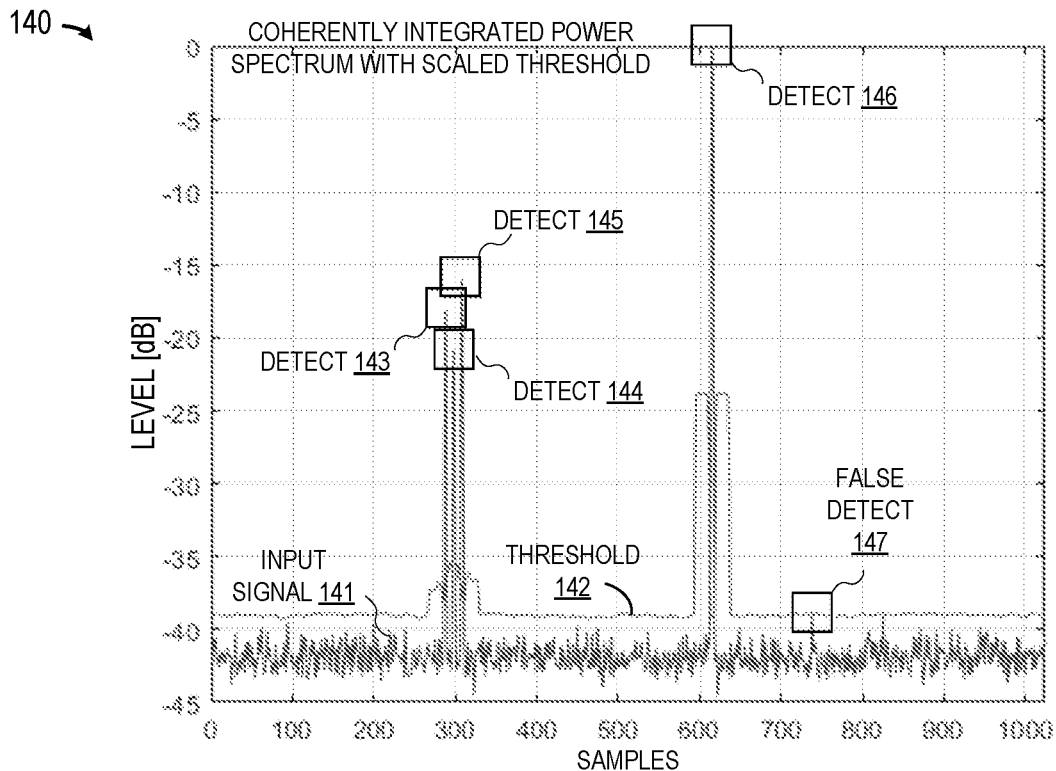
FIG. 14 depicts an example range profile for a scaled CA-CFAR threshold that is applied to a coherently integrated range-compressed input signal for detecting multiple targets, including three closely spaced high SNR targets in accordance with selected embodiments of the present disclosure.

Turning now to FIG. 14, there is depicted an example range profile 140 for a scaled CA-CFAR threshold 142 that is applied to a coherently integrated range-compressed input signal 141 for detecting multiple targets, including three closely spaced high SNR targets. As disclosed herein, the input signal 141 is generated as $M_{Nc}(\omega_n)=\max\{|F\{X(\omega_n)\}/N_c|^2\}$ to be the maximum value selected from the squared magnitude of the Fourier transform of the frequency domain signal ($X(\omega_n)$) divided by the number of channels $N_c$. In addition, the CFAR algorithm computes and applies the scaled CA-CFAR threshold 142 by first calculating a CFAR threshold $T_{CA}$ from the non-coherent integration data, and then applying a scaling factor $$\beta = -\frac{\ln\left(1 - \sqrt[N_c]{1-P_{FA}}\right)}{NN_c\left(P_{FA}^{-\frac{1}{N}} - 1\right)}$$

to compute a scaled CFAR threshold $T_{CA}'=\beta T_{CA}$. Once computed, the scaled CA-CFAR threshold 142 is applied to coherently integrated range-compressed input signal 141 to distinguish all four peaks 143-146 generated by targets from the peaks generated by the input signal noise 141. As a result of using coherent integration data, the SNR for the targets 143-146 is increased. In addition, both the average value and variance of the coherently integrated range-compressed input signal 141 is reduced. Finally, the scaled CA-CFAR threshold 142 is computed in a way that is less affected by the presence of high SNR targets to more closely fit the input signal 141 so that all four target peaks 143-146 are detected while maintaining the desired probability of false alarm $P_{FA}$. In addition, there is a non-zero probability of a false detection associated with application of the computed CA-CFAR threshold 142 to the power spectrum input signal 141, as indicated with the false detection 147 that is cause when a noise sample is detected.

Figure 15:
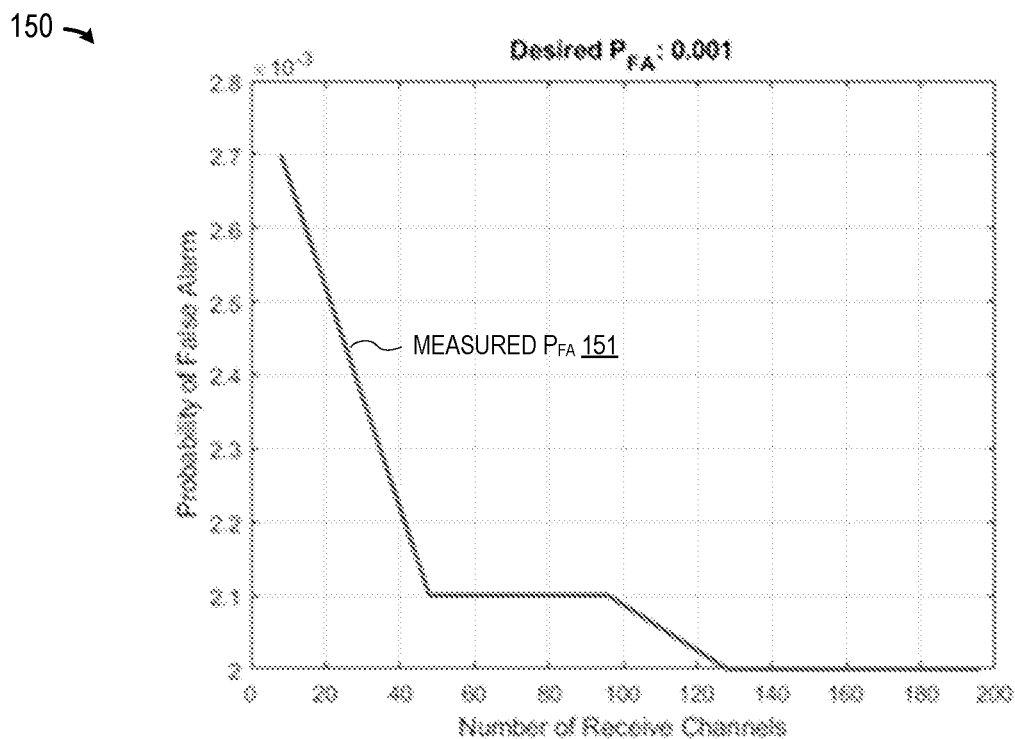
FIGS. 15-16 are graphical depictions of measured probability of false alarm as a function of the number of receive channels for different expected probability of false alarm values.
Figure 16:
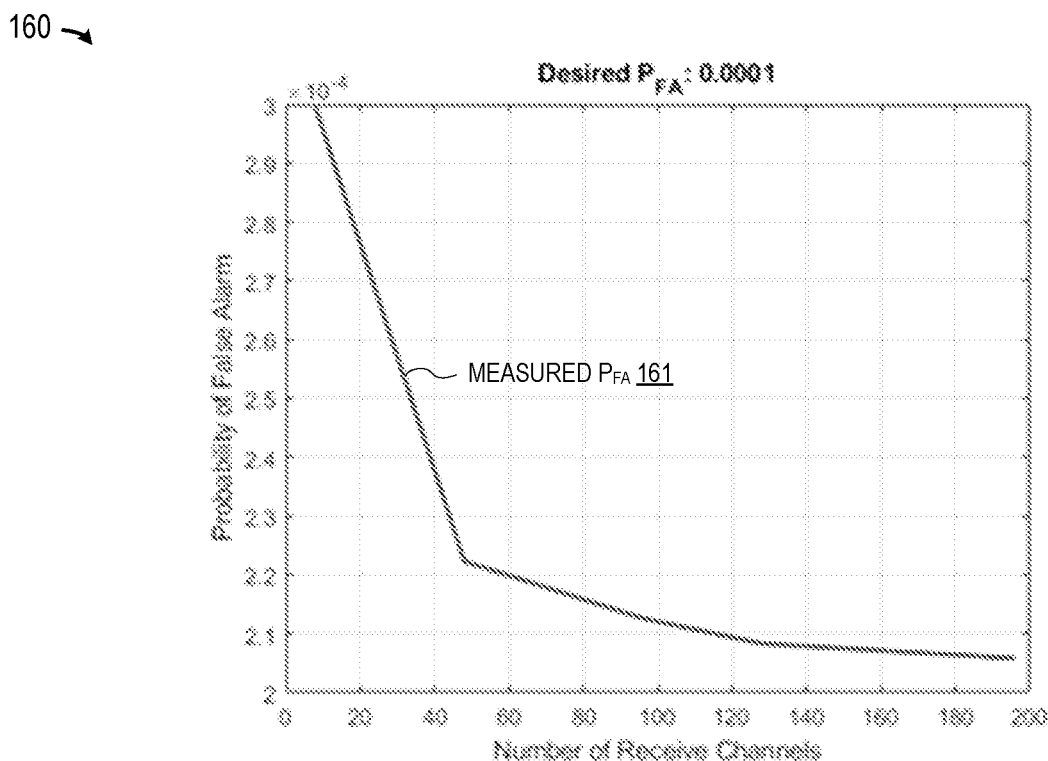

Turning now to FIGS. 15-16, there are graphically depictions of probability of false alarm measurements as a function of the number of receive channels $N_C$ for different expected probability of false alarm values. In particular, FIG. 15 depicts the measured probability of false alarm $P_{FA}$ 151 on a sample set of $10^4$ Monte-Carlo simulations where only noise is present for different values of $N_C$ between 8 and 192 when the expected $P_{FA}$ value was set to 0.001. In addition, FIG. 16 depicts the measured probability of false alarm $P_{FA}$ 161 on a sample set of $10^4$ Monte-Carlo simulations where only noise is present for different values of $N_C$ between 8 and 192 when the expected $P_{FA}$ value was set to 0.0001. As depicted, the true $P_{FA}$ for values below 192 converges towards twice the expected $P_{FA}$ value. Since this effect is independent of the expected $P_{FA}$ value, one may simply use a $P_{FA}$ half as large to obtain the desired $P_{FA}$.

Though selected embodiments of the CFAR detector are described herein with reference to using a square-law detector, it will be appreciated that the disclosed combination of non-coherent and coherent integration may also be applied with log-detector systems. As will be appreciated, Equation 33 (below) that is used to develop the log-detector CA-CFAR no longer holds true, as $z_n$ are no longer drawn from an exponential distribution:

$$\log\left(\frac{1}{N}\sum_{n=1}^{N} z_n\right) = \frac{1}{N}\sum_{n=1}^{N} \log(z_n) + \frac{1}{2}\log(\pi) \quad (33)$$

If $z_n$ are samples of the Power Spectral Density, obtained via non-coherent combining, and one assumes that all $z_n$ samples are noise, then all $z_n$ are equal among each other and equal to $\sigma_w^2$. As a result, Equation 33 can be rewritten as:

$$\log\left(\frac{1}{N}\sum_{n=1}^{N} \sigma_w^2\right) = \frac{1}{N}\sum_{n=1}^{N} \log(\sigma_w^2) \quad (34)$$

From the foregoing, it can be seen that no log-detection correction or scaling is needed when using a log detector if the power spectral density (non-coherent combining) is used to construct the CFAR threshold. As a result, the use of NCC-CI-CFAR together with a log detector provides a number of benefits, such as enhancing multi-target detection capabilities, reducing dynamic range, and SNR boosting.

Figure 17:
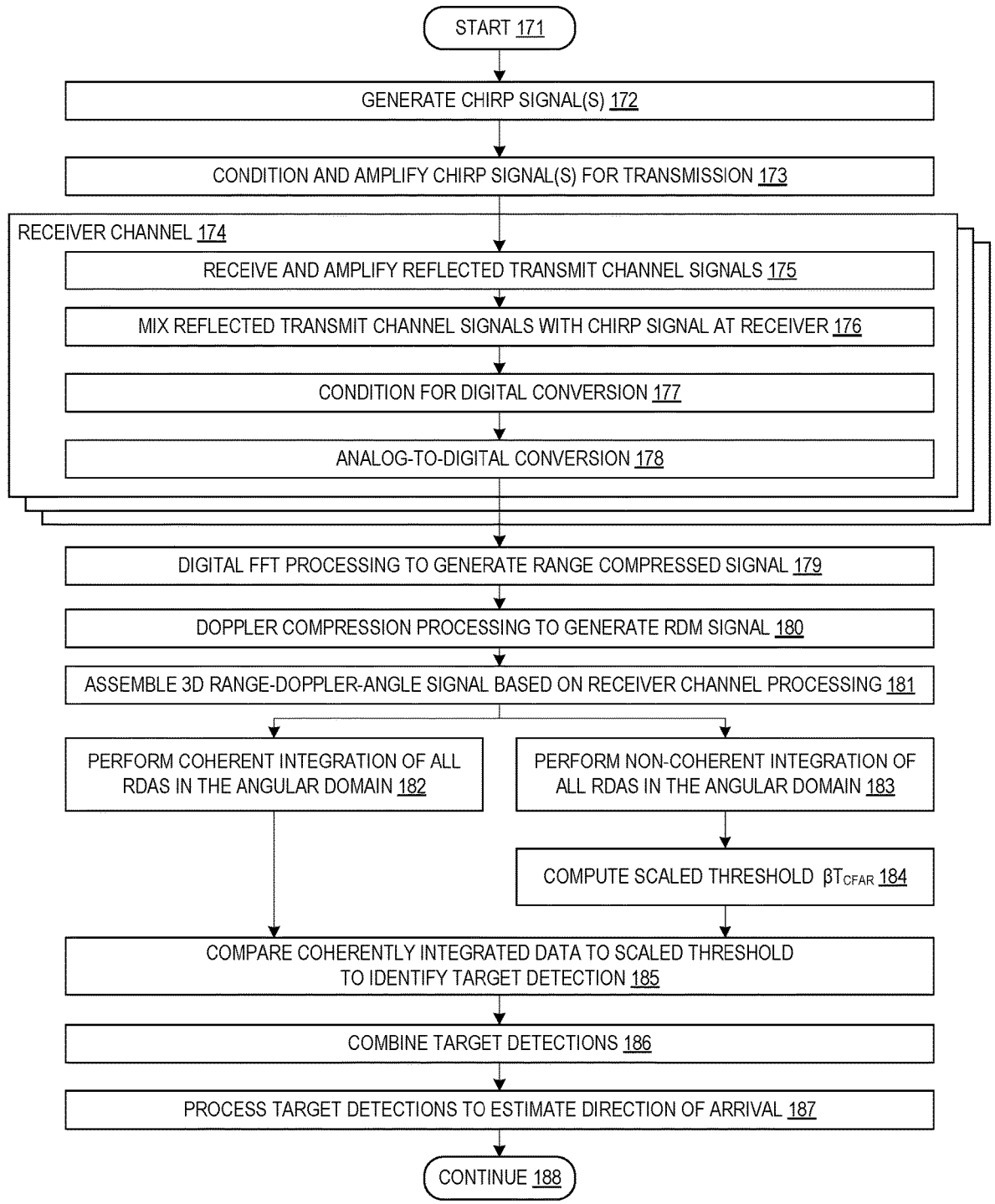
FIG. 17 illustrates a simplified flow chart showing the logic for using a cell-average CFAR algorithm which computes a scaled threshold from non-coherently integrated power spectrum data for application to coherently integrated power spectrum data in accordance with selected embodiments of the present disclosure.

To provide additional details for an improved understanding of selected embodiments of the present disclosure, reference is now made to FIG. 17 which illustrates a simplified flow chart 170 showing the logic for using a cell-average CFAR algorithm which computes a scaled threshold from non-coherently integrated power spectrum data for application to coherently integrated power spectrum data. In an example embodiment, the control logic and methodology shown in FIG. 17 may be implemented with a combination of hardware and software on a radar controller processor which uses an FFT accelerator to coherently integrate or combine a 3D Range-Doppler-Angle signal into a first 2D RDM signal and also uses processor or microcontroller unit to non-coherently integrate or combine the 3D Range-Doppler-Angle signal into a second 2D RDM signal for implementing a CA-CFAR detector and/or an OS-CFAR detector. Operating under control programming control code, the radar controller processor is configured to execute the cell average-constant false alarm rate detector algorithm for by estimating an extremely precise CFAR threshold based on a low SNR data set that is generated from non-coherently integrated data, and then applying the estimated CFAR threshold to high SNR data that is generated from coherently integrated data, thereby maximizing the probability of detection without degrading the probability of false alarm.

The process starts (step 171), such as when the radar system begins the process of sensing the location and movement of one or more target objects using one or more transmit radar signals that are sent over a plurality of transmit antennas. To generate the transmit radar signals, the radar system first generates a reference chirp signal (step 172), such as by periodically modulating a transmit radar signal with a frequency and/or phase shift. For example, with automotive Frequency Modulation Continuous Wave (FMCW) radars, the reference chirp signal may be generated as a Linear Frequency Modulation (LFM) waveform that is distributed to a plurality of transmit channel circuits which are respectively associated with a plurality of transmit antennas.

At step 173, the chirp signals are conditioned and amplified for transmission over the corresponding transmit channel circuits. In selected embodiments, this processing is performed by the transmit channel circuits which each include an RF conditioning module (which filters the chirp signal) and power amplifier (which amplifies the RF conditioning module output for transmission over a corresponding transmit antenna). In embodiments where time-domain modulation is used in combination with the frequency/phase offset modulation, the non-adjacent transmit channel circuits may be controlled to sequentially condition and amplify transmit radar waveforms from non-adjacent transmit antennas.

At step 174, each physical or virtual receiver channel generates a digital output signals D1 in the time domain x(t) using any suitable sequence of associated to each physical/virtual receiver. For example, each receiver channel may receive and amplify the reflected reference chirp signals from the different transmit channels at a receive processing step 175. In selected embodiments, one or more receive antennas at the receiver module receive target returns from the transmitted reference chirp signal waveforms as (radio frequency) antenna signals for subsequent amplification, such as by using a low noise amplifier to generate an amplified RF signal from the target returns.

In addition, each receiver channel may mix the amplified transmit channel signals with the reference chirp signal at the receiver at receiver mixing step 176 to generate an intermediate frequency (IF) signal. In selected embodiments, the mixing step may be implemented by applying the reference chirp signal to a receiver module mixer which is also connected to receive the amplified transmit channel signals for mixing with the reference chirp signal, thereby generating an intermediate frequency signal.

In addition, each receiver channel may condition the intermediate frequency signal for digital conversion at conditioning step 177. In selected embodiments, the conditioning process includes at least feeding the intermediate frequency signal to a bandpass-pass filter, alone or in combination with additional programmable gain and/or filtering steps, thereby generating a bandpass-filtered signal.

In addition, each receiver channel may digitize the bandpass-filtered conditioned IF signal at ADC step 178, such as by using a high-speed analog/digital converter (ADC) to generate a digital signal output that is suitable for digital processing. Because the maximum unambiguous range extent for each frequency offset reference chirp signal is inversely related to the fast-time sampling interval, the ADC has a high sampling rate.

At the radar controller, the digital signal outputs from the receiver channel(s) are acquired and digitally processed at step 179 to generate a range compressed signal where the reflected transmit channel signals are separated in the fast-time FFT or range domain. And at step 180, additional digital processing is applied to generate a Doppler compressed signal where the reflected transmit channel signals are separated in the slow-time FFT or Doppler domain. While any suitable radar signal processing steps may be used, each radar may be configured to perform fast-time FFT and slow-time FFT processing on the received radar signal to derive range and Doppler information. In the fast-time FFT processing, the frequency offset modulation of the reference chirp signals sent over the N transmission channels enables the spectrum to be divided into N consecutive segments with each being associated with a corresponding transmitter. Because the transmitters are separated or divided in the range domain and the waveform is based on LFM, the approach can also be referred to as the LFM range-division (RD) MIMO approach. Based on the range-spectrum division arrangement, the fast-time samples associated with distinct transmitters are then recovered (and whose sum and delta components are coherently summed for the case of I-channel only FOM,) and the subsequent MIMO virtual array processing can be carried out.

At step 181, the radar controller assembles a three-dimensional Range-Doppler-Angle signal or cube based on the previous receiver channel processing steps. As described herein, the 3D Range-Doppler-Angle signal has range-doppler-angle dimensions, where each entry in the angular dimension corresponds to a receiver channel for a total of $N_C$ entries.

At steps 182-185, the 3D Range-Doppler-Angle (RDA) signal is supplied in parallel to separate CFAR phased array pre-processing modules which are used to identify range-Doppler peak detections for use in estimating the direction of arrival for the target return(s). In a first pre-processing module or step 182, coherent integration of all RDAs in the angular domain is performed on the 3D Range-Doppler-Angle signal. In selected embodiments, the coherent integration or combining step 182 may be implemented with an FFT accelerator which implements matched filtering in the spatial domain (among receive channels) and applies a global maximum function on the absolute values of the matching filter's output. At the first processing module or step 182, the input data is the 3D RDM signal or radar cube, and the output is a first two-dimensional RDM of coherently integrated data.

In a second pre-processing module or step 183, non-coherent integration is performed of all RDAs in the angular domain of the 3D Range-Doppler-Angle. In selected embodiments, the non-coherent integration or combining step 183 may be implemented with a processor core which computes an average of the squared absolute values of the samples in the spatial domain (among receive channels). At the second processing module or step 183, the input data is the 3D Range-Doppler-Angle signal or radar cube, and the output is a second two-dimensional RDM of non-coherently integrated data.

At step 184, a scaled CFAR threshold $T_{CFAR}' = \beta T_{CFAR}$ is computed for each log detector sample value. In selected CA-CFAR embodiments, the threshold computation processing may compute or retrieve a predetermined scaling or mapping factor $\beta$ having a closed form solution, such as $$\beta = -\frac{\ln\left(1 - \sqrt[N_c]{1 - P_{FA}}\right)}{NN_c\left(P_{FA}^{-\frac{1}{N}} - 1\right)}.$$

In such CA-CFAR embodiments, the threshold computation processing may compute a CA-CFAR threshold $T_{CFAR\text{-}CA} = \sigma_w^2 \alpha_{CA}$ from the non-coherent integration data. Finally, the threshold computation processing may compute the scaled CA-CFAR threshold $T_{CFAR\text{-}CA}'$ as the product $\beta T_{CFAR\text{-}CA}$.

In selected OS-CFAR embodiments, the threshold computation processing step 184 may compute or retrieve a predetermined scaling or mapping factor $\beta$ having a closed form solution, such as $$\beta = -\frac{\ln\left(1 - \sqrt[N_c]{1 - P_{FA}}\right)}{NN_c\left(P_{FA}^{-\frac{1}{N}} - 1\right)}.$$

In such OS-CFAR embodiments, the threshold computation processing may compute an OS-CFAR threshold $T_{CFAR\text{-}OS} = \alpha_{OS} z_k$ from the non-coherent integration data. Finally, the threshold computation processing may compute the scaled OS-CFAR threshold $T_{CFAR\text{-}OS}'$ as the product $\beta T_{CFAR\text{-}OS}$.

At step 185, the coherently integrated data (from step 182) is compared to the scaled threshold $T_{CFAR}'$ (from step 184) to identify target detections. For example, a log detector sample value for the cell under test ($\lambda_{CUT}$) is compared to the scaled threshold $T_{CFAR}'$ for purposes of identifying target detections when $\lambda_{CUT} > T_{CFAR}'$. The processing at step 185 is repeated until all log detector sample values have been evaluated as a cell under test, such as by detecting if the last cell under test has been reached.

When the last cell under test is processed, then the processing proceeds to step 186 where the target detections identified by the CFAR algorithm processing steps 182-185 are combined to obtain the range-Doppler peak detections. At step 187, the combined target detections are processed to estimate the direction of arrival before continuing with spatial angle estimation processing, target tracking processing, and measurement processing (step 188), with the result being output to other automotive computing or user interfacing devices for further process or display.

As disclosed herein, a vehicle radar system, apparatus and method use a radar control processing unit to apply CFAR phased array pre-processing to compressed radar data signals by using a constant false alarm rate (CFAR) detector which non-coherently integrates the compressed radar data signals into sample values of a first RDM and which coherently integrates the compressed radar data signals into sample values of a second RDM which are used to compute a scaled CFAR threshold that is applied to the coherently integrated sample values of the first RDM data. As disclosed herein, the compressed radar data signals may be generated as three-dimensional Range-Doppler Matrices or Synthetic Aperture Radar Images, and the first and second RDMs may each be generated as two-dimensional matrices. In addition, the scaled CFAR threshold may be computed by multiplying a CA-CFAR threshold (or an OS-CFAR threshold) by the computed CFAR scaling factor $\beta$.

By now it should be appreciated that there has been provided a radar system, device, and method for computing a constant false alarm rate (CFAR) threshold with a radar control processing unit. The disclosed radar system includes a radio-frequency (RF) transmitter unit and first plurality of transmit antennas which are connected and controlled by the radar control processing unit to transmit MIMO radar signals. The disclosed radar system also includes an RF receiver unit and a first plurality of receive antennas which are connected and controlled by the radar control processing unit to generate digital output signals from MIMO radar signal returns received in response to the MIMO radar signals. The disclosed radar control processing unit is configured as a constant false alarm rate (CFAR) detector to generate compressed radar data signals from the digital output signals. In selected embodiments, the compressed radar data signals are generated as an n dimensional matrix (e.g., integer value n=3) of range and/or Doppler compressed image data. In selected embodiments, the radar control processing unit may be configured as a CFAR square-law detector or a CFAR log detector. The compressed radar data signals are applied in parallel as an n dimensional matrix to a coherent integrator and a non-coherent integrator. As disclosed, the coherent integrator generates an n−1 dimensional matrix of coherently integrated image data from the compressed radar data signals. In addition, the non-coherent integrator generates an n−1 dimensional matrix of non-coherently integrated image data from the compressed radar data signals. In selected embodiments, the coherent integrator uses a fast Fourier transform (FFT) accelerator to generate the n−1 dimensional matrix of coherently integrated image data, and the non-coherent integrator uses a processor core to generate a n−1 dimensional matrix of non-coherently integrated image data. In other embodiments, the coherent integrator may be configured to generate the n−1 dimensional matrix of coherently integrated image data by performing a matched filtering process in a spatial domain of the n dimensional matrix of compressed radar data signals and applying a global maximum on absolute values of output data from the matched filtering process. In addition, the non-coherent integrator may be configured to generate the n−1 dimensional matrix of non-coherently integrated image data by computing an average of squared absolute values of the samples in a spatial domain of the n dimensional matrix of compressed radar data signals. In addition, the disclosed radar control processing unit is configured to generate a CFAR threshold from the n−1 dimensional matrix of non-coherently integrated image data. In addition, the disclosed radar control processing unit is configured to detect one or more targets in the MIMO radar signal returns by applying the CFAR threshold to the n−1 dimensional matrix of coherently integrated image data to detect sample values from the n−1 dimensional matrix of coherently integrated image data that exceed the CFAR threshold. In selected embodiments, the radar control processing unit is configured to generate the CFAR threshold by computing an ordered statistics CFAR (OS-CFAR) threshold as a product of a predetermined scaling factor $$\beta = -\frac{\ln\left(1 - \sqrt[N_c]{1 - P_{FA}}\right)}{NN_c\left(P_{FA}^{-\frac{1}{N}} - 1\right)}$$

and an OS-CFAR threshold $T_{CFAR-OS} = \alpha_{OS} z_k$ that is generated from the n−1 dimensional matrix of non-coherently integrated image data. In other embodiments, the radar control processing unit is configured to generate the CFAR threshold by computing a cell-average CFAR (CA-CFAR) threshold as a product of a predetermined scaling factor $$\beta = -\frac{\ln\left(1 - \sqrt[N_c]{1 - P_{FA}}\right)}{NN_c\left(P_{FA}^{-\frac{1}{N}} - 1\right)}$$

and a CA-CFAR threshold $T_{CFAR-CA} = \hat{\sigma}_w^2 \alpha_{CA}$ that is generated from the n−1 dimensional matrix of non-coherently integrated image data.

In another form, there is provided a method for operating a radar system and device wherein a CFAR threshold is computed and used to detect targets. In the disclosed methodology, MIMO radar signals are transmitted from transit antennas in a plurality of transmit and receive antennas, and MIMO radar signal returns are received at receive antennas in the plurality of transmit and receive antennas. In addition, the MIMO radar signal returns are processed with a plurality of receive channels to generate compressed radar data signals as a three-dimensional matrix that are supplied in parallel to a coherent integrator and a non-coherent integrator in a CFAR detector. In selected embodiments, the MIMO radar signal returns are processed to generate the compressed radar data signals as a three-dimensional matrix of range and Doppler compressed image data. The disclosed methodology also coherently combines the compressed radar data signals at the coherent integrator to generate a two-dimensional matrix of coherently integrated image data from the compressed radar data signals. In addition, the disclosed methodology non-coherently combines the compressed radar data signals at the non-coherent integrator to generate a two-dimensional matrix of non-coherently integrated image data from the compressed radar data signals. The disclosed methodology also generates a CFAR threshold from the two-dimensional matrix of non-coherently integrated image data. In selected embodiments, the CFAR threshold is generated by computing an ordered statistics CFAR (OS-CFAR) threshold as a product of a predetermined scaling factor $$\beta = -\frac{\ln\left(1 - \sqrt[N_c]{1 - P_{FA}}\right)}{NN_c\left(P_{FA}^{-\frac{1}{N}} - 1\right)}$$

and an OS-CFAR threshold $T_{CFAR-OS}$ that is generated from the two-dimensional matrix of non-coherently integrated image data, where Nc specifies the plurality of receive channels, where $P_{FA}$ is a desired probability of false alarm, and where N specifies how many data samples are used to construct the OS-CFAR threshold $T_{CFAR-OS}$. In other embodiments, the CFAR threshold is generated by computing a cell-average CFAR (CA-CFAR) threshold as a product of a predetermined scaling factor $$\beta = -\frac{\ln\left(1 - \sqrt[N_c]{1 - P_{FA}}\right)}{NN_c\left(P_{FA}^{-\frac{1}{N}} - 1\right)}$$

and a CA-CFAR threshold $T_{CFAR-CA}$ that is generated from the two-dimensional matrix of non-coherently integrated image data, where Nc specifies the plurality of receive channels, where $P_{FA}$ is a desired probability of false alarm, and where N specifies how many data samples are used to construct the CA-CFAR threshold $T_{CFAR-CA}$. In selected embodiments, the compressed radar data signals are coherently combined by using a fast Fourier transform (FFT) accelerator to compress the three-dimensional matrix of range and Doppler compressed image data into the two-dimensional matrix of coherently integrated image data, and the compressed radar data signals are non-coherently combined by using a processor core to compress the three-dimensional matrix of range and Doppler compressed image data into the two-dimensional matrix of non-coherently integrated image data. In such embodiments, the compressed radar data signals are coherently combined by performing a matched filtering process in a spatial domain of the three-dimensional matrix of compressed radar data signals and applying a global maximum on absolute values of output data from the matched filtering process. In addition, the compressed radar data signals may be non-coherently combined by computing an average of squared absolute values of the samples in a spatial domain of the three-dimensional matrix of compressed radar data signals. Finally, the disclosed methodology applies the CFAR threshold to the two-dimensional matrix of coherently integrated image data to detect sample values from the two-dimensional matrix of coherently integrated image data that exceed the CFAR threshold, thereby identifying one or more targets in the MIMO radar signal returns.

In yet another form, there is provided a radar apparatus and associated method of operation. In the disclosed radar apparatus, a transmitter is configured to transmit a first transmit signal and a second transmit signal. The radar apparatus also includes a receiver that is configured to produce digital output signals from first and second transmit signal returns received in response to the first and second transmit signals. In addition, the radar apparatus includes a digital signal processor configured to process the digital output signals with a CFAR detector. To this end, the digital signal processor is configured to generate, from the digital output signals, range and Doppler compressed radar data signals as an dimensional matrix (e.g., integer value n=3) of compressed image data. In addition, the digital signal processor is configured to coherently combine the range and Doppler compressed radar data signals at the CFAR detector to generate an n−1 dimensional matrix of coherently integrated image data from the range and Doppler compressed radar data signals. In addition, the digital signal processor is configured to non-coherently combine the range and Doppler compressed radar data signals at the CFAR detector to generate an n−1 dimensional matrix of non-coherently integrated image data from the compressed radar data signals. In selected embodiments, the CFAR detector may use a fast Fourier transform (FFT) accelerator to generate the n−1 dimensional matrix of coherently integrated image data, and may use a processor core to generate a n−1 dimensional matrix of non-coherently integrated image data. In selected embodiments, the digital signal processor may be configured to coherently combine the range and Doppler compressed radar data signals by performing a matched filtering process in a spatial domain of the n dimensional matrix of compressed radar data signals and applying a global maximum on absolute values of output data from the matched filtering process. In addition, the digital signal processor may be configured to non-coherently combine the range and Doppler compressed radar data signals by computing an average of squared absolute values of the samples in a spatial domain of the n dimensional matrix of compressed radar data signals. In addition, the digital signal processor is configured to generate a CFAR threshold from the n−1 dimensional matrix of non-coherently integrated image data, and to apply the CFAR threshold to the n−1 dimensional matrix of coherently integrated image data to detect sample values from the n−1 dimensional matrix of coherently integrated image data that exceed the CFAR threshold, thereby identifying one or more targets in the MIMO radar signal returns. In selected embodiments, the CFAR detector may be a square-law detector or a log detector or other suitable CFAR detector.

Although the described exemplary embodiments disclosed herein focus on example automotive radar circuits, systems, and methods for using same, the present invention is not necessarily limited to the example embodiments illustrate herein. For example, various embodiments of a distributed aperture radar may be applied in non-automotive applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radar system, comprising:
   a radio-frequency (RF) transmitter unit and first plurality of transmit antennas which are connected to transmit MIMO (multiple input multiple output radar signals;
   an RF receiver unit and a first plurality of receive antennas which are connected to generate digital output signals from MIMO radar signal returns received in response to the MIMO radar signals; and
   a radar control processing unit connected and configured to control the RF transmitter unit and the RF receiver unit;
   wherein the radar control processing unit is configured as a constant false alarm rate (CFAR) detector to generate, from the digital output signals, compressed radar data signals that are applied in parallel as an n dimensional matrix, with n having a value of at least 3, to:
   a coherent integrator which generates an n−1 dimensional matrix of coherently integrated image data from the compressed radar data signals, and
   a non-coherent integrator which generates an n−1 dimensional matrix of non-coherently integrated image data from the compressed radar data signals;
   wherein the radar control processing unit is further configured to generate a CFAR threshold from the n−1 dimensional matrix of non-coherently integrated image data; and
   wherein the radar control processing unit is further configured to detect one or more targets in the MIMO radar signal returns by applying the CFAR threshold to the n−1 dimensional matrix of coherently integrated image data to detect sample values from the n−1 dimensional matrix of coherently integrated image data that exceed the CFAR threshold.

2. The radar system of claim 1, wherein the radar control processing unit is configured to generate the CFAR threshold by computing an ordered statistics CFAR (OS-CFAR) threshold as a product of a predetermined scaling factor $$\beta = -\frac{\ln\left(1 - \sqrt[N_c]{1 - P_{FA}}\right)}{NN_c\left(P_{FA}^{-\frac{1}{N}} - 1\right)}$$

and an OS-CFAR threshold $T_{CFAR-OS}$ that is generated from the n−1 dimensional matrix of non-coherently integrated image data, where Nc specifies the plurality of receive channels, where $P_{FA}$ is a desired probability of false alarm, and where N specifies how many data samples are used to construct the OS-CFAR threshold $T_{CFAR-OS}$.

3. The radar system of claim 1, wherein the radar control processing unit is configured to generate the CFAR threshold by computing a cell-average CFAR (CA-CFAR) threshold as a product of a predetermined scaling facto $$\beta = -\frac{\ln\left(1 - \sqrt[N_c]{1 - P_{FA}}\right)}{NN_c\left(P_{FA}^{-\frac{1}{N}} - 1\right)}$$

and a CA-CFAR threshold $T_{CFAR-CA} = \hat{\sigma}_w^2 \alpha_{CA}$ that is generated from the n−1 dimensional matrix of non-coherently integrated image data, where Nc specifies the plurality of receive channels, where $P_{FA}$ is a desired probability of false alarm, and where N specifies how many data samples are used to construct the CA-CFAR threshold $T_{CFAR-CA}$.

4. The radar system of claim 1, wherein the radar control processing unit is further configured to generate the compressed radar data signals as an n dimensional matrix of range and Doppler compressed image data.

5. The radar system of claim 1, wherein the coherent integrator uses a fast Fourier transform (FFT) accelerator to generate the n−1 dimensional matrix of coherently integrated image data, and wherein the non-coherent integrator uses a processor core to generate an n−1 dimensional matrix of non-coherently integrated image data.

6. The radar system of claim 5, wherein the coherent integrator is configured to generate the n−1 dimensional matrix of coherently integrated image data by performing a matched filtering process in a spatial domain of the n dimensional matrix of compressed radar data signals and applying a global maximum on absolute values of output data from the matched filtering process.

7. The radar system of claim 5, wherein the non-coherent integrator is configured to generate the n−1 dimensional matrix of non-coherently integrated image data by computing an average of squared absolute values of the samples in a spatial domain of the n dimensional matrix of compressed radar data signals.

8. The radar system of claim 1, wherein the radar control processing unit is configured as a CFAR square-law detector.

9. The radar system of claim 1, wherein the radar control processing unit is configured as a CFAR log detector.

10. A method for operating a radar system, comprising:
transmitting MIMO (multiple input multiple output radar signals from transit antennas in a plurality of transmit and receive antennas;
receiving MIMO radar signal returns at receive antennas in the plurality of transmit and receive antennas;
processing the MIMO radar signal returns with a plurality of receive channels to generate compressed radar data signals as a three-dimensional matrix;
supplying the compressed radar data signals in parallel to a coherent integrator and a non-coherent integrator in a constant false alarm rate (CFAR) detector;
coherently combining the compressed radar data signals at the coherent integrator to generate a two-dimensional matrix of coherently integrated image data from the compressed radar data signals;
non-coherently combining the compressed radar data signals at the non-coherent integrator to generate a two-dimensional matrix of non-coherently integrated image data from the compressed radar data signals;
generating a CFAR threshold from the two-dimensional matrix of non-coherently integrated image data; and
applying the CFAR threshold to the two-dimensional matrix of coherently integrated image data to detect sample values from the two-dimensional matrix of coherently integrated image data that exceed the CFAR threshold, thereby identifying one or more targets in the MIMO radar signal returns.

11. The method of claim 10, wherein generating the CFAR threshold comprises computing an ordered statistics CFAR (OS-CFAR) threshold as a product of a predetermined scaling factor $$\beta = -\frac{\ln\left(1 - \sqrt[N_c]{1 - P_{FA}}\right)}{NN_c\left(P_{FA}^{-\frac{1}{N}} - 1\right)}$$

and an OS-CFAR threshold $T_{CFAR-OS}$ that is generated from the two-dimensional matrix of non-coherently integrated image data, where Nc specifies the plurality of receive channels, where $P_{FA}$ is a desired probability of false alarm, and where N specifies how many data samples are used to construct the OS-CFAR threshold $T_{CFAR-OS}$.

12. The method of claim 10, wherein generating the CFAR threshold comprises computing a cell-average CFAR (CA-CFAR) threshold as a product of a predetermined scaling factor $$\beta = -\frac{\ln\left(1 - \sqrt[N_c]{1 - P_{FA}}\right)}{NN_c\left(P_{FA}^{-\frac{1}{N}} - 1\right)}$$

and a CA-CFAR threshold $T_{CFAR-CA}$ that is generated from the two-dimensional matrix of non-coherently integrated image data, where Nc specifies the plurality of receive channels, where $P_{FA}$ is a desired probability of false alarm, and where N specifies how many data samples are used to construct the CA-CFAR threshold $T_{CFAR-CA}$.

13. The method of claim 10, wherein processing the MIMO radar signal returns comprises generating the compressed radar data signals as a three-dimensional matrix of range and Doppler compressed image data.

14. The method of claim 13, wherein coherently combining the compressed radar data signals comprises using a fast Fourier transform (FFT) accelerator to compress the three-dimensional matrix of range and Doppler compressed image data into the two-dimensional matrix of coherently integrated image data, and wherein non-coherently combining the compressed radar data signals comprises using a processor core to compress the three-dimensional matrix of range and Doppler compressed image data into the two-dimensional matrix of non-coherently integrated image data.

15. The method of claim 14, wherein coherently combining the compressed radar data signals comprises performing a matched filtering process in a spatial domain of the three-dimensional matrix of compressed radar data signals and applying a global maximum on absolute values of output data from the matched filtering process.

16. The method of claim 14, wherein non-coherently combining the compressed radar data signals comprises computing an average of squared absolute values of the samples in a spatial domain of the three-dimensional matrix of compressed radar data signals.

17. A radar apparatus, comprising:
a transmitter configured to transmit a first transmit signal and a second transmit signal;
a receiver configured to produce digital output signals from first and second transmit signal returns received in response to the first and second transmit signals; and
a digital signal processor configured to:
generate, from the digital output signals, range and Doppler compressed radar data signals as an n dimensional matrix of compressed image data, with n having a value of at least 3;
coherently combine the range and Doppler compressed radar data signals at a constant false alarm rate (CFAR) detector to generate an n−1 dimensional matrix of coherently integrated image data from the range and Doppler compressed radar data signals;
non-coherently combine the range and Doppler compressed radar data signals at the CFAR detector to generate an n−1 dimensional matrix of non-coherently integrated image data from the compressed radar data signals;

generate a CFAR threshold from the n−1 dimensional matrix of non-coherently integrated image data; and apply the CFAR threshold to the n−1 dimensional matrix of coherently integrated image data to detect sample values from the n−1 dimensional matrix of coherently integrated image data that exceed the CFAR threshold, thereby identifying one or more targets in the first and second transmit radar signal returns.

18. The radar apparatus of claim 17, where the CFAR detector comprises a square-law detector or a log detector.

19. The radar apparatus of claim 17, wherein the CFAR detector uses a fast Fourier transform (FFT) accelerator to generate the n−1 dimensional matrix of coherently integrated image data, and wherein the CFAR detector uses a processor core to generate an n−1 dimensional matrix of non-coherently integrated image data.

20. The radar apparatus of claim 17, wherein the digital signal processor is configured to coherently combine the range and Doppler compressed radar data signals by performing a matched filtering process in a spatial domain of the n dimensional matrix of compressed radar data signals and applying a global maximum on absolute values of output data from the matched filtering process; and wherein the digital signal processor is configured to non-coherently combine the range and Doppler compressed radar data signals by computing an average of squared absolute values of the samples in a spatial domain of the n dimensional matrix of compressed radar data signals.

* * * * *